US009001635B2

(12) United States Patent
Minami

(10) Patent No.: US 9,001,635 B2
(45) Date of Patent: Apr. 7, 2015

(54) OPTICAL ELEMENT AND OPTICAL HEAD APPARATUS INCLUDING THE SAME

(71) Applicant: Panasonic Corporation, Osaka (JP)

(72) Inventor: Kazuhiro Minami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/306,797

(22) Filed: Jun. 17, 2014

(65) Prior Publication Data
US 2014/0293766 A1 Oct. 2, 2014

Related U.S. Application Data

(63) Continuation of application No. PCT/JP2012/008228, filed on Dec. 25, 2012.

(30) Foreign Application Priority Data

Dec. 28, 2011 (JP) .................................. 2011-288461

(51) Int. Cl.
G11B 7/00 (2006.01)
G11B 7/1353 (2012.01)
G11B 7/1374 (2012.01)
G11B 7/1367 (2012.01)

(52) U.S. Cl.
CPC ............ G11B 7/1353 (2013.01); G11B 7/1374 (2013.01); G11B 2007/0006 (2013.01); G11B 7/1367 (2013.01)

(58) Field of Classification Search
None
See application file for complete search history.

(56) References Cited

U.S. PATENT DOCUMENTS

| 2009/0034398 A1 | 2/2009 | Kaneda et al. | |
| 2010/0284259 A1* | 11/2010 | Nakamura | 369/112.03 |
| 2011/0007622 A1* | 1/2011 | Mimori | 369/112.23 |
| 2012/0075978 A1* | 3/2012 | Hayashi et al. | 369/112.04 |

FOREIGN PATENT DOCUMENTS

| EP | 2530674 A1 * | 7/2011 | ............. G11B 7/135 |
| EP | 2 530 674 | 12/2012 | |
| JP | 2010-170694 | 8/2010 | |
| WO | 2011/093007 | 8/2011 | |

OTHER PUBLICATIONS

International Search Report issued Mar. 19, 2013 in International (PCT) Application No. PCT/JP2012/008228.

* cited by examiner

Primary Examiner — Brenda Bernardi
(74) Attorney, Agent, or Firm — Wenderoth, Lind & Ponack, L.L.P.

(57) ABSTRACT

An optical element having compatibility among two or more wavelengths and having an excellent converging performance for light with each wavelength, and an optical head apparatus using the optical element are provided. An optical element according to the present disclosure has a first region including an optical axis and a second region formed around the outer circumference of the first region. The first region and the second region respectively have a first diffraction structure and a second diffraction structure each cyclically formed on an aspheric surface and having a step-like cross section. In the first region, the number of steps included between top portions of the first diffraction structure is different from the number of steps included between the optical axis and a top portion that is closest to the optical axis in the first diffraction structure.

11 Claims, 14 Drawing Sheets

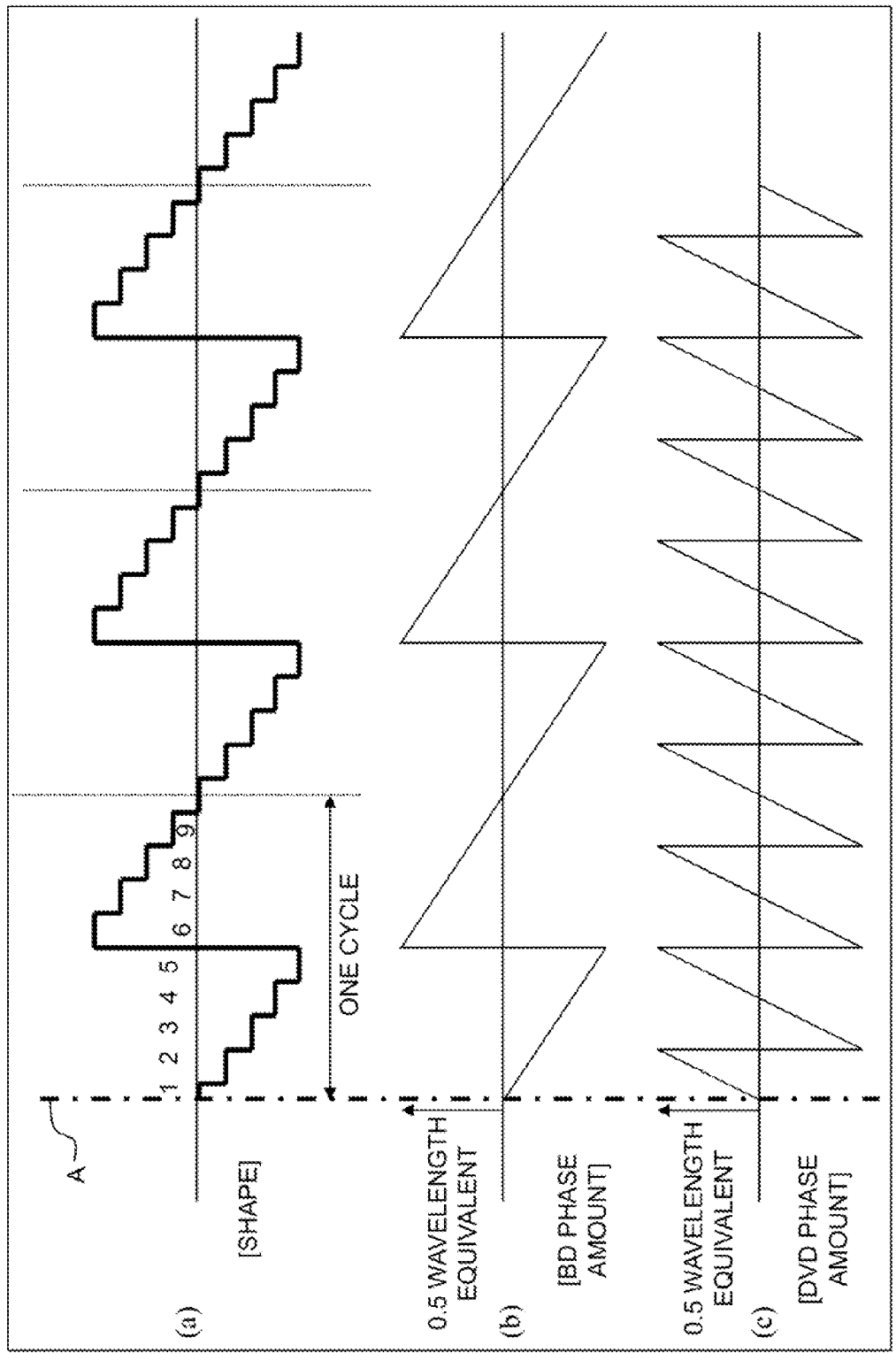

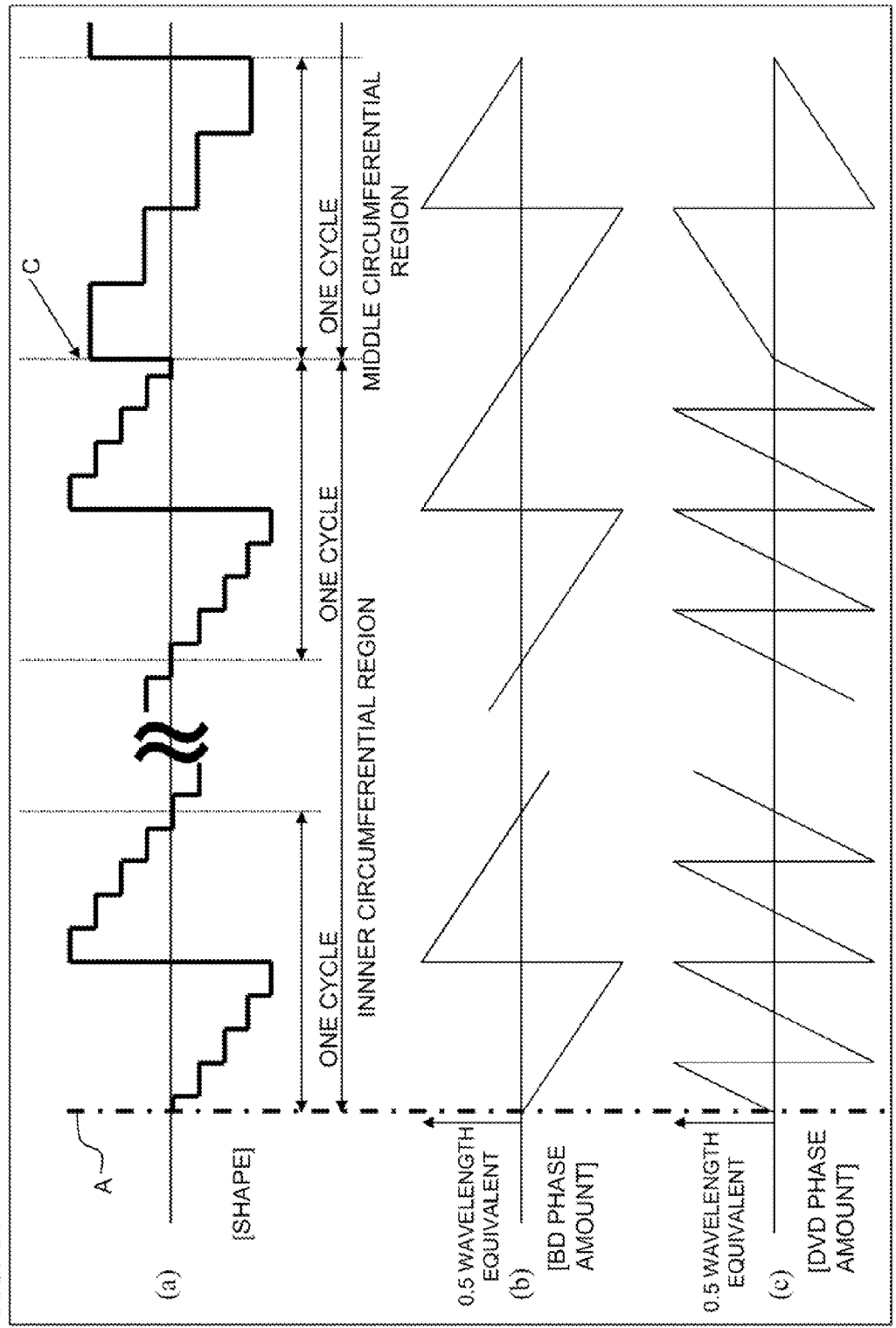

OPTICAL ELEMENT AND OPTICAL HEAD APPARATUS INCLUDING THE SAME

CROSS REFERENCE TO RELATED APPLICATION

The disclosure of International Patent Application No. PCT/JP2012/008228 filed on Dec. 25, 2012, claiming priority based on Japanese Patent Application No. 2011-288461 filed in Japan on Dec. 28, 2011, is incorporated herein by reference.

BACKGROUND OF THE INVENTION

1. Field of the Invention

The present disclosure relates to an optical element and an optical head apparatus including the same, which are used for storing information into an optical information medium such as an optical disc or reproducing or deleting information stored in the optical information medium.

2. Description of the Background Art

Japanese Laid-Open Patent Publication No. 2010-170694 discloses an objective lens having compatibility among three types of information storage media of BD, DVD, and CD, and an optical head apparatus using the objective lens.

SUMMARY OF THE INVENTION

The present disclosure provides an optical element having compatibility among two or more wavelengths and having an excellent converging performance for light with each wavelength, and an optical head apparatus including the optical element.

An optical element according to the present disclosure has at least one surface divided into a plurality of regions, and includes: a first region including an optical axis and configured to converge light with a wavelength $\lambda 1$ onto a storage surface of a first optical disc and converge light with a wavelength $\lambda 2$ onto a storage surface of a second optical disc; and a second region formed around the outer circumference of the first region and configured to converge light with the wavelength $\lambda 1$ onto the storage surface of the first optical disc and converge light with the wavelength $\lambda 2$ onto the storage surface of the second optical disc. The first region has a first diffraction structure cyclically formed on an aspheric surface and having a step-like cross section, and the second region has a second diffraction structure cyclically formed on an aspheric surface and having a step-like cross section. In the first region, the number of steps included between top portions of the first diffraction structure is different from the number of steps included between the optical axis and a top portion that is closest to the optical axis in the first diffraction structure.

Another optical element according to the present disclosure has at least one surface divided into a plurality of regions, and includes: a first region including an optical axis and configured to converge light with a wavelength $\lambda 1$ onto a storage surface of a first optical disc and converge light with a wavelength $\lambda 2$ onto a storage surface of a second optical disc; and a second region formed around the outer circumference of the first region and configured to converge light with the wavelength $\lambda 1$ onto the storage surface of the first optical disc and converge light with the wavelength $\lambda 2$ onto the storage surface of the second optical disc. The first region has a first diffraction structure cyclically formed on a first aspheric surface and having a step-like cross section, and the second region has a second diffraction structure cyclically formed on a second aspheric surface and having a step-like cross section. Further, the optical element satisfies the following conditions:

$$-0.25 < (\Phi 11 + \Phi 12) - N1 < 0.25 \quad (1)$$

$$-0.25 < (\Phi 21 + \Phi 22) - N2 < 0.25 \quad (2)$$

where, $\Phi 11$ is a phase difference with reference to a phase at the first aspheric surface, $\Phi 11$ being given by a step in the first region, that is closest to the second region, for light with the wavelength $\lambda 1$ to be converged onto the first optical disc, $\Phi 12$ is a phase difference with reference to a phase at the second aspheric surface, $\Phi 12$ being given by a step in the second region, that is closest to the first region, for light with the wavelength $\lambda 1$ to be converged onto the first optical disc, $\Phi 21$ is a phase difference with reference to the phase at the first aspheric surface, $\Phi 21$ being given by the step in the first region, that is closest to the second region, for light with the wavelength $\lambda 2$ to be converged onto the second optical disc, $\Phi 22$ is a phase difference with reference to the phase at the second aspheric surface, $\Phi 22$ being given by the step in the second region, that is closest to the first region, for light with the wavelength $\lambda 2$ to be converged onto the second optical disc, N1 is an integer obtained by rounding the first decimal place of a numerical value given by $\Phi 11 + \Phi 12$, and N2 is an integer obtained by rounding the first decimal place of a numerical value given by $\Phi 21 + \Phi 22$.

The optical element and the optical head apparatus including the same according to the present disclosure are effective for ensuring compatibility among two or more wavelengths and improving the converging performance for light with each wavelength.

BRIEF DESCRIPTION OF THE DRAWINGS

FIG. 13 is a schematic configuration showing a diffraction structure in an inner circumferential region of an objective lens of example 3; and FIG. 14 is a schematic configuration showing a diffraction structure of the objective lens of example 3.

DESCRIPTION OF THE PREFERRED EMBODIMENTS

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

First Embodiment 1-1. Optical Head

Figure 1:
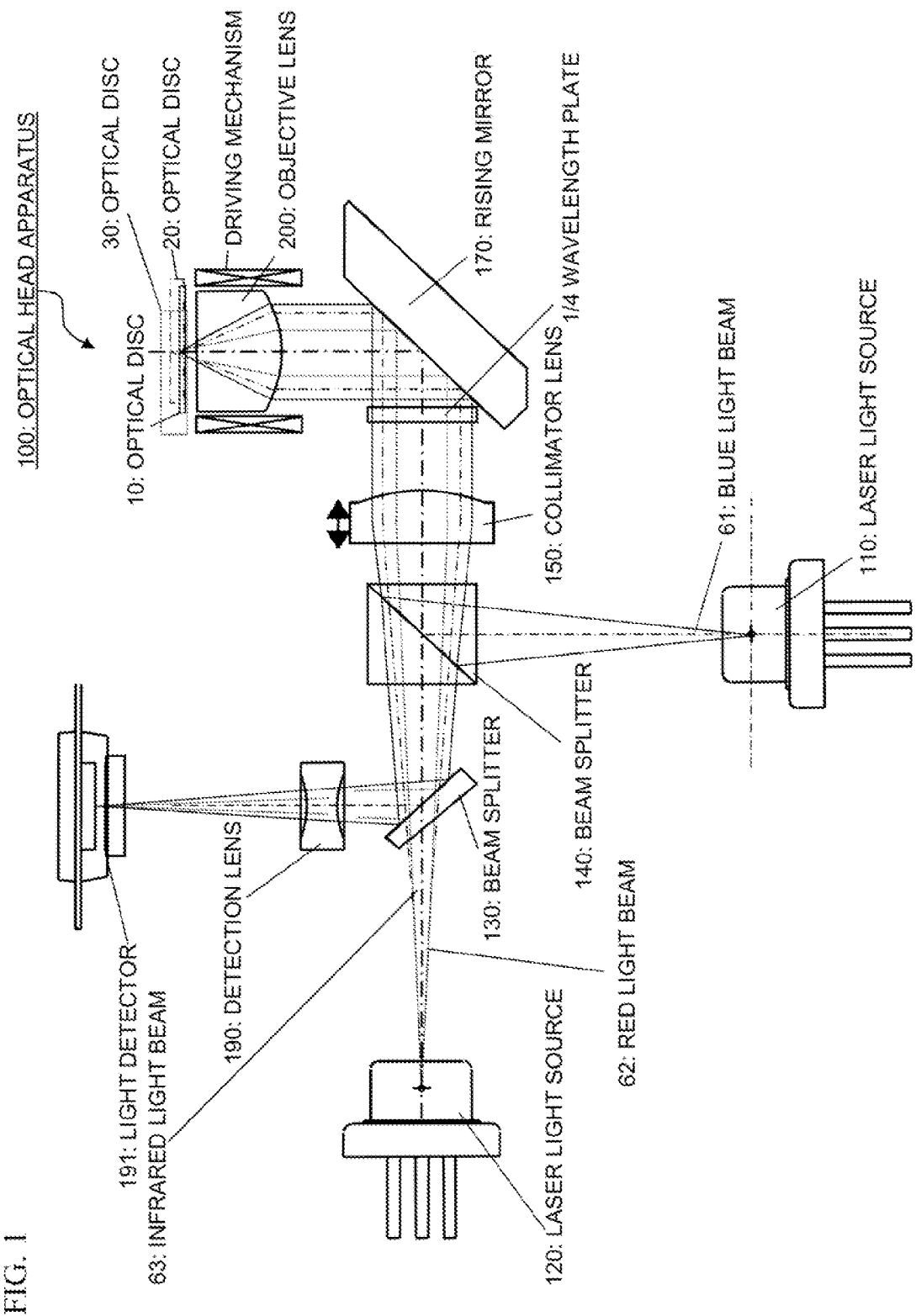
FIG. 1 is a schematic configuration diagram of an optical head apparatus of the first embodiment.

FIG. 1 is a schematic configuration diagram of an optical head apparatus 100 according to the first embodiment.

The optical head apparatus 100 according to the first embodiment is configured to have compatibility among a BD standard, a DVD standard, and a CD standard.

A laser light source 110 emits a blue light beam 61 with a wavelength $\lambda 1$. The wavelength $\lambda 1$ is 350 to 450 nm. Specifically, in the present embodiment, light with a wavelength of 400 nm or close thereto is used. The blue light beam 61 emitted from the laser light source 110 is reflected by a beam splitter 140 and then converted into substantially parallel lights by a collimator lens 150. The collimator lens 150 is movable in the optical axis direction, and by moving in the optical axis direction, corrects spherical aberration due to variation in base material thickness of an optical disc or difference in base material thickness of each information storage surface. The blue beam 61 having passed through the collimator lens 150 is reflected by a rising mirror 170, enters an objective lens 200, and then is converged onto an information storage surface of an optical disc 10, to form a proper spot thereon. The blue light beam 61 reflected by the information storage surface of the optical disc 10 passes through the objective lens 200 again, is reflected by the rising mirror 170, and passes through the collimator lens 150 and then the beam splitter 140. The blue light beam 61 emitted from the beam splitter 140 is reflected by a beam splitter 130, and then converged onto a light detector 191 by a detection lens 190, to be detected as an optical signal.

A laser light source 120 is a two-wavelength laser light source which selectively emits red light and infrared light. A red light beam 62 emitted from the laser light source 120 passes through the beam splitter 130 and the beam splitter 140, and enters the collimator lens 150, to be converted into diverging light. The collimator lens 150 can adjust the parallelism of the light flux of the red light beam 62 by moving in the optical axis direction. In addition, similarly to the case of using the optical disc 10, the collimator lens 150 corrects spherical aberration due to the difference in disc base material thickness, temperature variation, wavelength variation, or the like by moving in the optical axis direction. The red light beam 62 having passed through the collimator lens 150 is, as diverging light, reflected by the rising mirror 170, enters the objective lens 200, and then is converged onto an information storage surface of an optical disc 20, to form a proper spot thereon. The red light beam 62 reflected by the information storage surface of the optical disc 20 passes through the objective lens 200 again, is reflected by the rising mirror 170, and passes through the collimator lens 150 and then the beam splitter 140. The red light beam 62 emitted by the beam splitter 140 is reflected by the beam splitter 130, and then converged onto the light detector 191 by the detection lens 190, to be detected as an optical signal.

An infrared light beam 63 emitted from the laser light source 120 passes through the beam splitter 140 and the beam splitter 130, and enters the collimator lens 150, to be converted into diverging light. The infrared light beam 63 emitted from the collimator lens 150 is reflected by the rising mirror 170, enters the objective lens 200, and then is converged onto an information storage surface of an optical disc 30, to form a proper spot thereon. The infrared light beam 63 reflected by the information storage surface of the optical disc 30 passes through the objective lens 200 again, is reflected by the rising mirror 170, and passes through the collimator lens 150 and then the beam splitter 140. Then, the infrared light beam 63 is reflected by the beam splitter 130, and then converged by the detection lens 190, to be detected as an optical signal by the light detector 191.

1-2. Objective Lens

Figure 2:
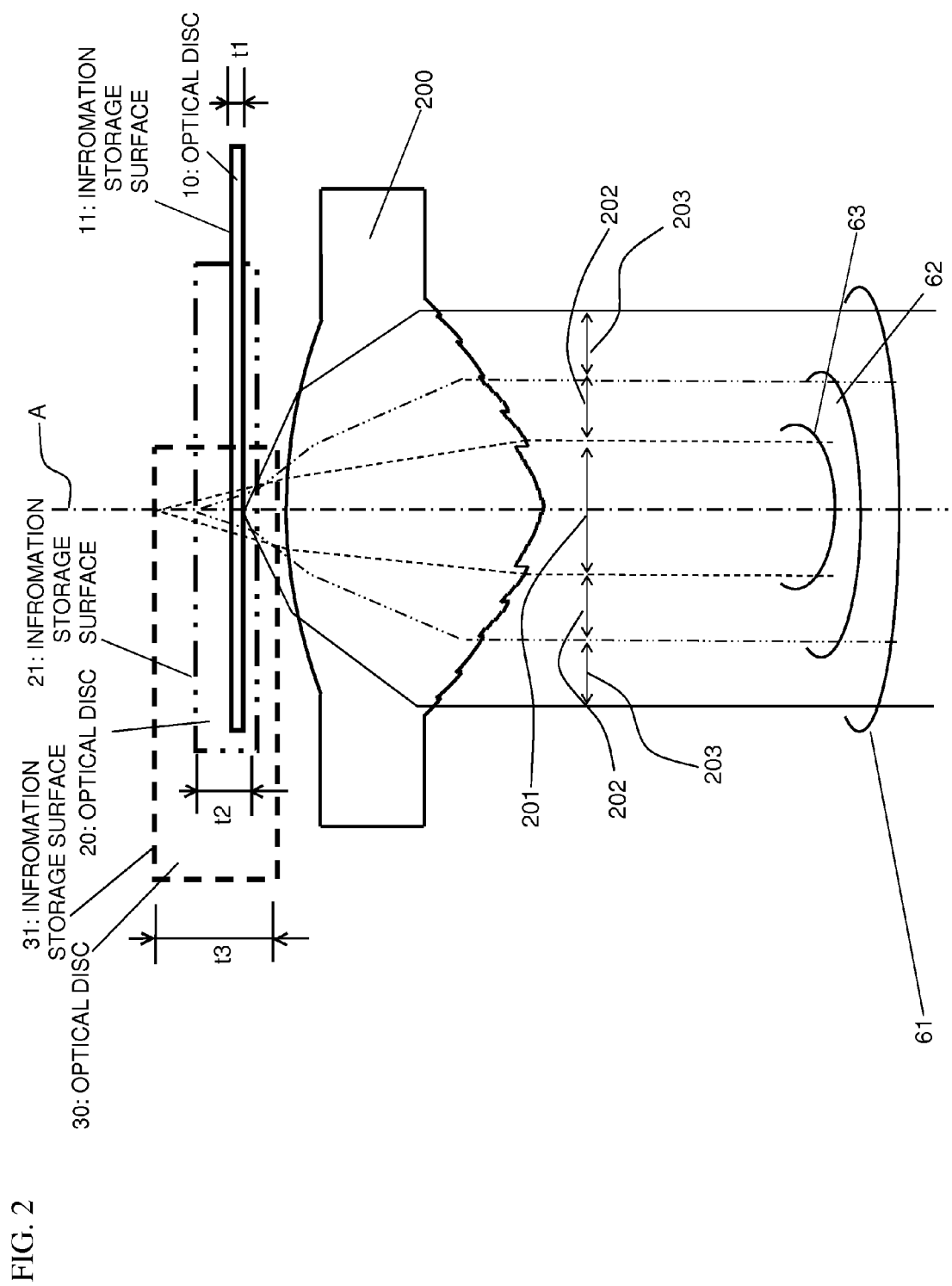
FIG. 2 is a schematic sectional view of an objective lens of the first embodiment.

Next, the objective lens 200 of the present embodiment will be described. FIG. 2 is a schematic sectional view of the objective lens 200 of the present embodiment.

The objective lens 200 according to the first embodiment has compatibility among a BD standard, a DVD standard, and a CD standard. The objective lens 200 converges blue light with a wavelength $\lambda 1$ (400 nm or close thereto) onto an information storage surface via a base plate with a thickness t1 (0.1 mm), to form a spot on the information storage surface, converges red light with a wavelength $\lambda 2$ (680 nm or close thereto) onto an information storage surface via a base plate with a thickness t2 (0.6 mm), to form a spot on the information storage surface, and converges infrared light with a wavelength $\lambda 3$ (780 nm or close thereto) onto an information storage surface via a base plate with a thickness t3 (1.2 mm), to form a spot on the information storage surface.

An optical function surface on the incident side of the objective lens 200 is divided into three regions centered on the optical axis, that is, an inner circumferential region 201 including the optical axis, a ring-shaped middle circumferential region 202 surrounding the inner circumferential region 201, and a ring-shaped outer circumferential region 203 surrounding the middle circumferential region 202. Different step-like diffraction structures are respectively provided in the inner circumferential region 201 and the middle circumferential region 202. A concave-convex structure is provided in the outer circumferential region 203.

The inner circumferential region 201 is a region which contributes to spot formation of lights with three wavelengths for BD, DVD, and CD. The inner circumferential region 201 is an example of a first region.

The middle circumferential region 202 is a region which contributes to sport formation of lights with two wavelengths for BD and DVD. The middle circumferential region 202 is an example of a second region.

The outer circumferential region 203 is a dedicated region which contributes to spot formation of light only for BD.

1-3. Optical Function Surface

Figure 3:
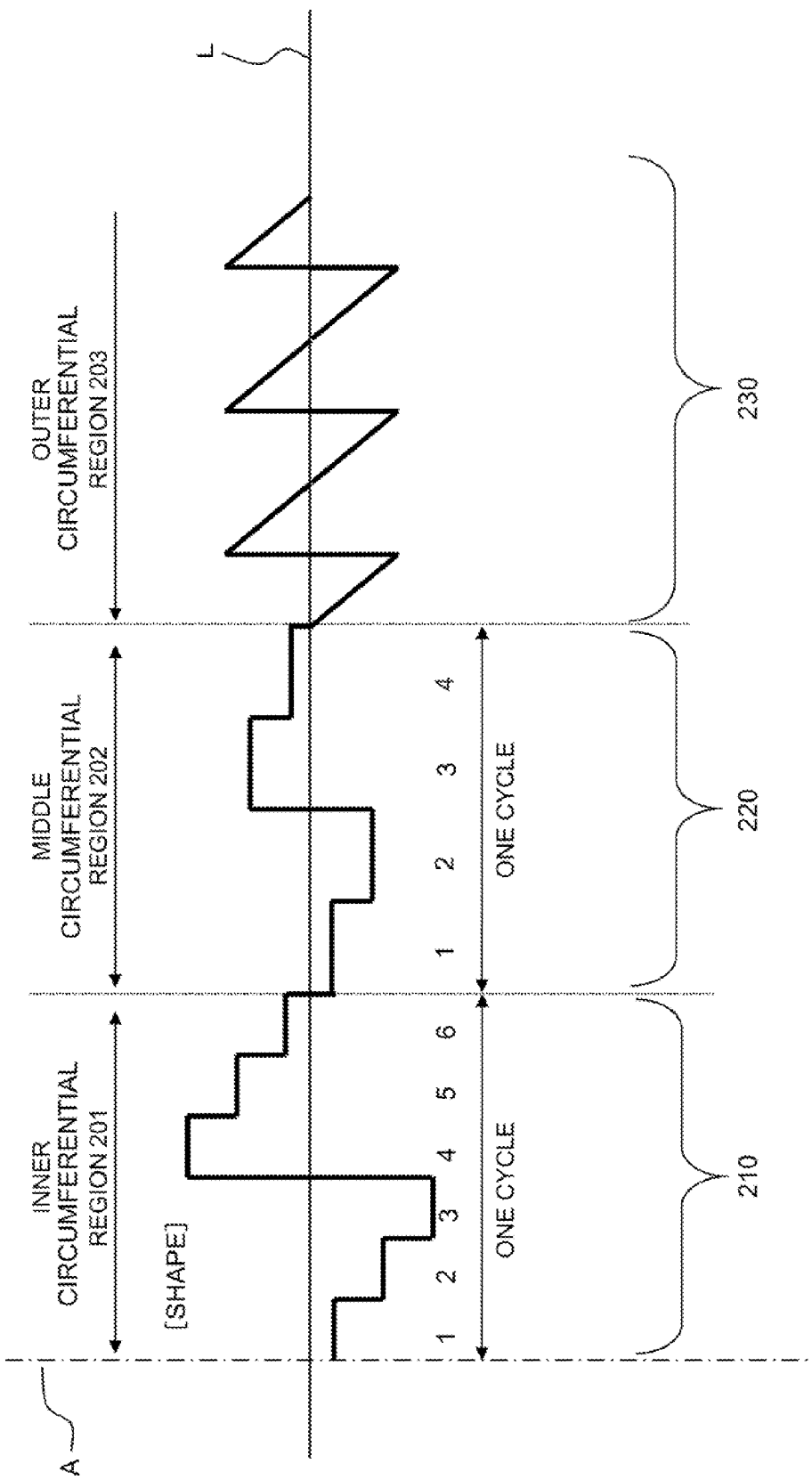
FIG. 3 is a partial enlarged diagram showing a diffraction shape of the objective lens element of the first embodiment.

Next, an optical function surface of the objective lens 200 of the present embodiment will be described. FIG. 3 is a partial enlarged diagram for explaining the shape of the optical function surface of the objective lens 200. The optical function surface of the objective lens 200 has a step-like diffraction structure and a sawtooth structure formed thereon. It is noted that actually, the step-like diffraction structure and the sawtooth structure are formed on an aspheric base surface. However, here, for simplifying the description, FIG. 3 shows the state in which the aspheric shape of the base surface is eliminated and the step-like diffraction structure and the sawtooth structure are formed on a flat plane. In the following description, a line segment L shown in FIG. 3 represents a base surface L.

In addition, in FIG. 3, a portion under the step-like diffraction structure and the sawtooth structure is a lens material such as glass, and a portion above the step-like diffraction structure and the sawtooth structure is air. It is noted that in the following description, unless otherwise described, also in other drawings showing partial enlarged diagrams of the step-like diffraction structure and the sawtooth structure, a portion under the step-like diffraction structure and the sawtooth structure is a lens material and a portion above those structures is air.

The objective lens 200 mainly has the inner circumferential region 201, the middle circumferential region 202, and the outer circumferential region 203.

The objective lens 200 has a first step-like diffraction structure 210 formed in the inner circumferential region 201, a second step-like diffraction structure 220 formed in the middle circumferential region 202, and a sawtooth structure 230 formed in the outer circumferential region 203. The step-like shape shown in FIG. 3 is merely an example, and therefore may be another shape. In addition, the shape of a connection portion between the structures in the respective regions shown in FIG. 3 is merely an example, and therefore the shape of a connection portion between the structures in the respective regions may be set as appropriate. In addition, for simplifying the description, the first step-like diffraction structure 210 is drawn for just one cycle in the inner circumferential region 201, but actually, a plurality of the first step-like diffraction structures 210 are provided. Similarly, the second step-like shape 220 is drawn for just one cycle in the middle circumferential region 202, but actually, a plurality of the second step-like diffraction structures 220 are provided.

Hereinafter, each region will be described.

The first diffraction structure 210 provided in the inner circumferential region 201 is a step-like cyclic structure in which one cycle is formed by six levels of steps such that their heights monotonously decrease step by step along with increase in the distance from an optical axis A of the lens. Here, a level number refers to the number of step portions of the step-like shape that are substantially parallel with the base surface of the lens, in one cycle of the cyclic structure.

The step height of the step-like diffraction structure in the inner circumferential region 201 is designed such that, upon usage of blue (BD) light with the wavelength $\lambda 1$, the diffraction efficiency of +2nd order diffracted light is maximized, upon usage of red (DVD) light with the wavelength $\lambda 2$, the diffraction efficiency of −1st order diffracted light is maximized, and upon usage of infrared (CD) light with the wavelength $\lambda 3$, the diffraction efficiency of −2nd order diffracted light is maximized. Here, positive and negative signs of the diffraction order will be described. First, the direction in which light entering a first surface is refracted by the curvature of the first surface is defined as a reference direction. Then, the diffraction order in the case where the light entering the first surface travels in such a direction that the light is converged by diffraction inward relative to the reference direction, is defined as positive.

The one cycle of the step-like diffraction structure provided in the inner circumferential region 201 may not necessarily be formed by six levels of steps, but may be formed by steps of levels other than six levels.

The second diffraction structure 220 provided in the middle circumferential region 202 is a step-like cyclic structure in which one cycle is formed by four levels of steps such that their heights monotonously decrease step by step along with increase in the distance from the optical axis A of the lens. The step height of the step-like diffraction structure in the middle circumferential region 202 is designed such that, upon usage of BD light with the wavelength $\lambda 1$, the diffraction efficiency of +1st order diffracted light is maximized, and upon usage of DVD light with the wavelength $\lambda 2$, the diffraction efficiency of −1st order diffracted light is maximized. One cycle of the step-like diffraction structure provided in the middle circumferential region 202 may not necessarily be formed by four levels of steps, but may be formed by steps of levels other than four levels. In addition, for the diffraction order in the present embodiment, a diffraction order that maximizes the diffraction efficiency for each wavelength is selected. However, a diffraction order that does not maximize the diffraction efficiency may be used.

The height of the sawtooth diffraction structure provided in the outer circumferential region 203 is designed such that light with a wavelength for BD passing through the outer circumferential region 203 is diffracted at +1st diffraction order so as to contribute to formation of a spot on a storage surface of an optical disc.

1-4. Characteristic Part

The present embodiment has a feature that in the inner circumferential region, the number of steps included between top portions of the first diffraction structure 210 is different from the number of steps included between the optical axis A and the top portion of the first diffraction structure 210, that is closest to the optical axis. It is noted that a top portion of the first diffraction structure 210 refers to a portion that is highest from the base surface in the first diffraction structure 210.

By thus designing the inner circumferential region, the aberration of the objective lens is reduced, and as a result, an optical element with an excellent performance, having compatibility among three wavelengths for BD, DVD, and CD, can be realized. Hereinafter, the reason will be described.

FIGS. 4 to 7 are schematic diagrams for explaining a phase change amount given for BD light and DVD light by the step-like diffraction structure.

FIG. 4(a) is a diagram showing a conventional step-like diffraction structure 410 formed in an inner circumferential region. FIG. 4(b) is a diagram for explaining a phase difference given for BD light by the conventional step-like diffraction structure 410. FIG. 4(c) is a diagram for explaining a phase difference given for DVD light by the conventional step-like diffraction structure 410.

FIG. 5(a) is a diagram showing a conventional step-like diffraction shape 420 formed in a middle circumferential region. FIG. 5(b) is a diagram for explaining a phase difference given for BD light by the conventional step-like diffraction structure 420. FIG. 5(c) is a diagram for explaining a phase difference given for DVD light by the conventional step-like diffraction structure 420.

Figure 4:
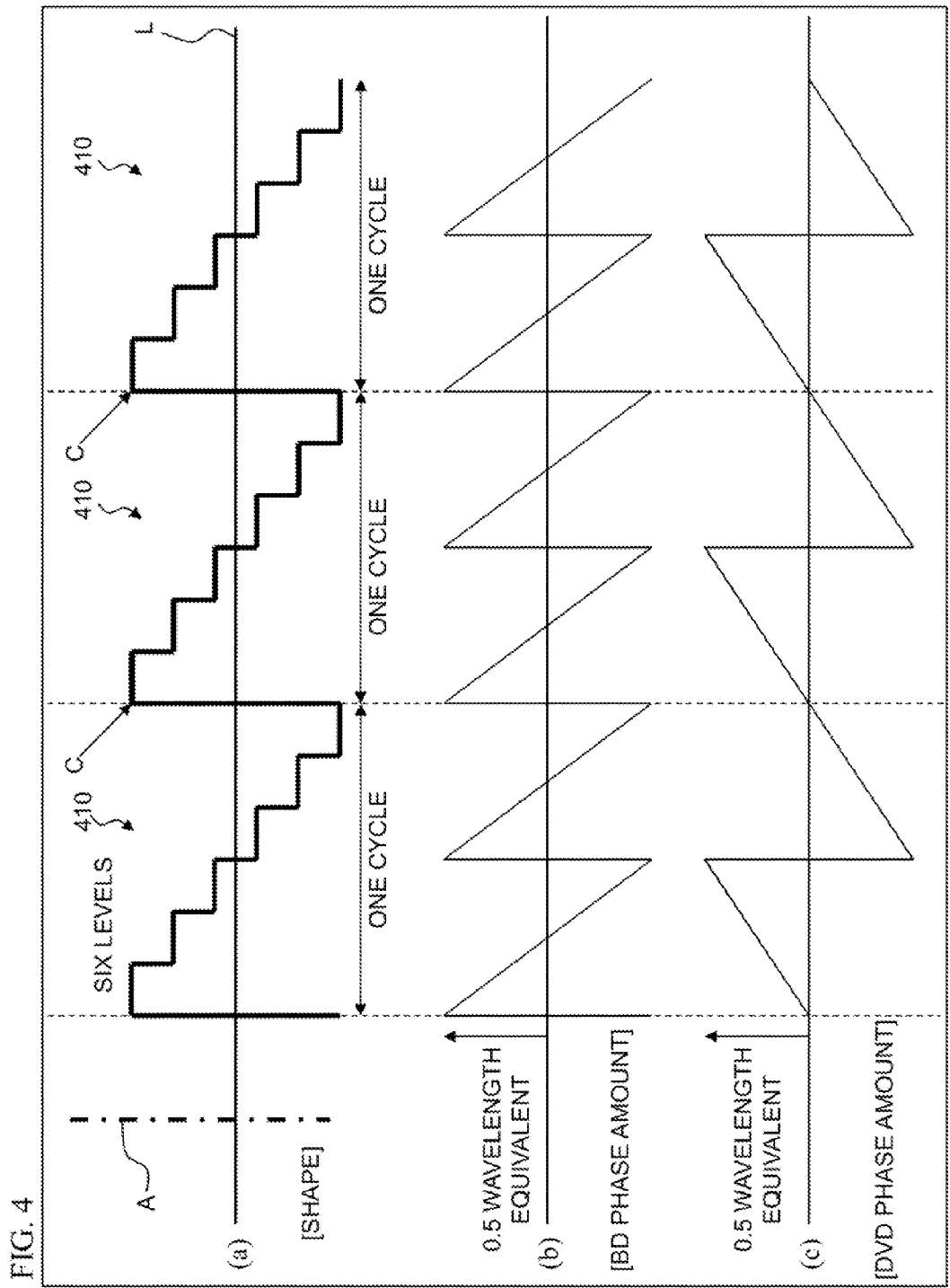
FIG. 4(a) is a diagram showing a conventional step-like diffraction structure formed in an inner circumferential region.
FIG. 4(b) is a diagram for explaining a phase difference given for BD light by the conventional step-like diffraction structure.
FIG. 4(c) is a diagram for explaining a phase difference given for DVD light by the conventional step-like diffraction structure 410.
Figure 5:
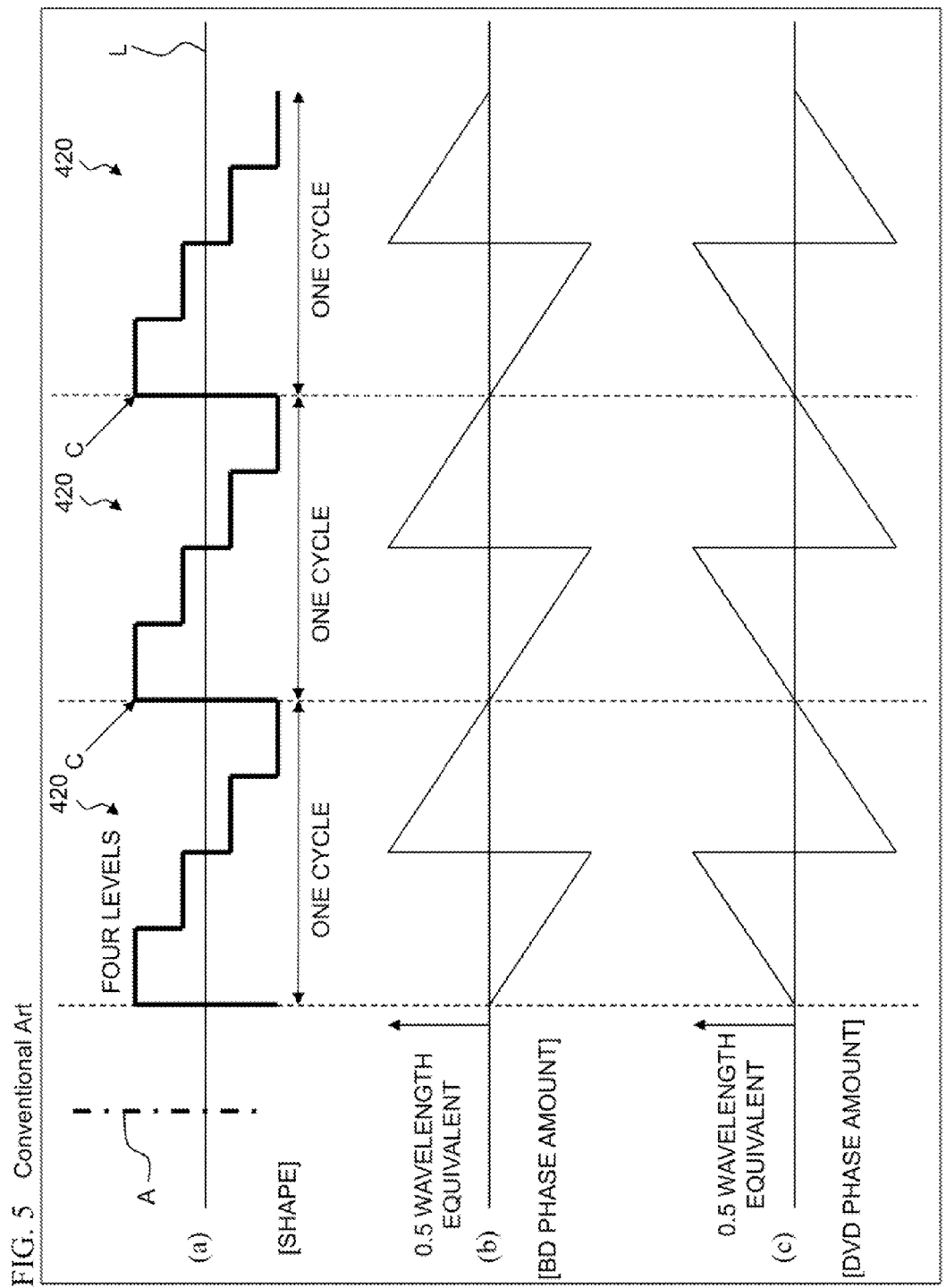
FIG. 5(a) is a diagram showing a conventional step-like diffraction shape formed in a middle circumferential region.
FIG. 5(b) is a diagram for explaining a phase difference given for BD light by the conventional step-like diffraction structure.
FIG. 5(c) is a diagram for explaining a phase difference given for DVD light by the conventional step-like diffraction structure 420.
Figure 6:
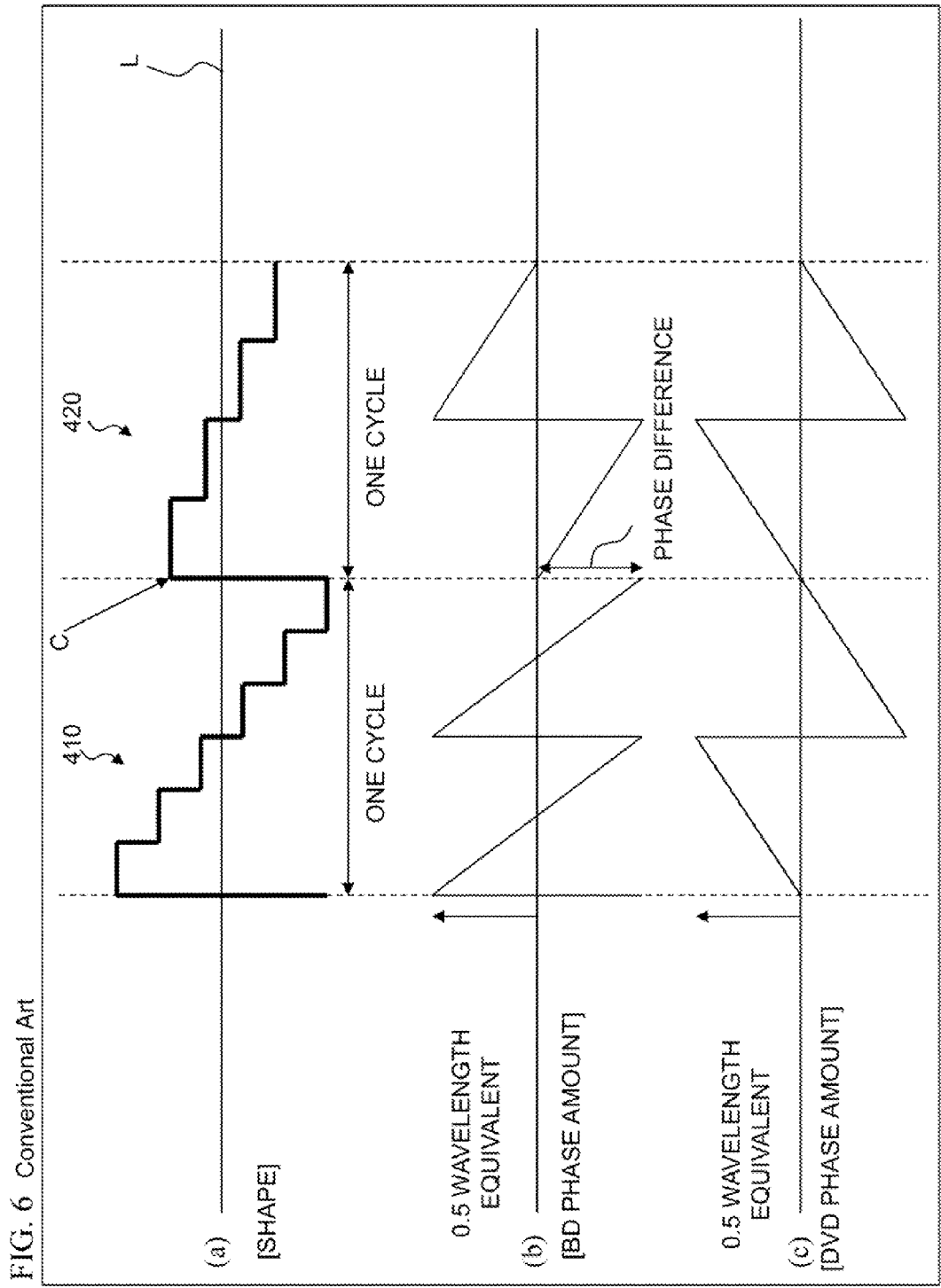
FIG. 6(a) is a diagram showing the state in which the conventional step-like diffraction shapes are formed in one optical function surface.
FIG. 6(b) is a diagram for explaining a phase difference given for BD light by the step-like diffraction structures.
FIG. 6(c) is a diagram for explaining a phase difference given for DVD light by the conventional step-like diffraction structures.

FIG. 6(a) is a diagram showing the state in which the conventional step-like diffraction shapes 410 and 420 shown in FIGS. 4 and 5 are formed in one optical function surface. FIG. 6(b) is a diagram for explaining a phase difference given for BD light by the conventional step-like diffraction structures 410 and 420. FIG. 6(c) is a diagram for explaining a phase difference given for DVD light by the conventional step-like diffraction structures 410 and 420.

FIG. 7(a) is a diagram showing the first step-like diffraction structure 210 formed in the inner circumferential region 201 and the second step-like diffraction structure formed in the middle circumferential region 202 of the objective lens 200 of the present embodiment. FIG. 7(b) is a diagram for explaining a phase difference given for BD light by the step-like diffraction structure of the present embodiment. FIG. 7(c) is a diagram for explaining a phase difference given for DVD light by the step-like diffraction structure of the present embodiment.

In a compatible lens having compatibility among a plurality of formats, different step-like diffraction shapes are formed provided with the inner circumferential region and the outer circumferential region. The step-like diffraction shape has a function of causing a phase difference in accordance with the wavelength of passing light, at each step portion.

First, with reference to FIGS. 4(a) to 4(c), the conventional step-like diffraction structure formed in the inner circumferential region will be described. The step-like diffraction structure 410 shown in FIG. 4(a) is a six-level structure. As shown in FIG. 4(a), the conventional structure is designed such that one cycle is formed by steps from the highest portion to the lowest portion in the step-like diffraction structure 410 in the direction perpendicular to the optical axis A.

As shown in FIG. 4(a), in the case where the step-like diffraction shape is formed by six levels, the depth of one step is designed to have a distance corresponding to about 1.33 wavelengths for BD light. Although a phase difference caused by one step corresponds to about 1.33 wavelengths for BD light, a phase difference corresponding to an integer multiple of wavelength does not influence formation of a spot. Therefore, this one step is equivalent to a step causing a phase difference corresponding to about 0.33 wavelength for BD light. In the present embodiment, there are six steps in one cycle, and a phase difference corresponding to about 0.33 wavelength occurs per one step. As a result, as shown in FIG. 4(b), a phase difference corresponding to about 2 wavelengths occurs for BD light over one cycle. That is, BD light passing through the inner circumferential region 201 is diffracted at +2nd diffraction order.

A distance corresponding to about 1.33 wavelengths for BD light is a distance corresponding to about 0.83 wavelength for DVD light. This is due to the wavelength difference between BD light and DVD light and the difference in refractive index of the optical element. Although a phase difference caused by one step corresponds to about 0.83 wavelength for DVD light, a phase difference corresponding to an integer multiple of wavelength does not influence formation of a spot. Therefore, this one step is equivalent to a step causing a phase difference corresponding to about −0.17 wavelength for DVD light, in the direction opposite to the case of BD light. Here, there are six steps in one cycle, and a phase difference corresponding to about −0.17 wavelength occurs per one step. As a result, as shown in FIG. 4(c), a phase difference corresponding to about −1 wavelength occurs for DVD light over one cycle. That is, DVD light passing through the inner circumferential region 201 is diffracted at −1st diffraction order.

Here, a connection portion C between the step-like diffraction structures 410 will be particularly described. In the case of the conventional structure as shown in FIG. 4(a), at the connection portion C between the step-like diffraction shapes, a phase difference corresponding to about 0.5 wavelength or about −0.5 wavelength with reference to the phase at the base surface L occurs for BD light (see FIG. 4(b)). On the other hand, for DVD light, at the connection portion C, there is almost no phase difference with reference to the phase at the base surface L (see FIG. 4(b)).

Next, with reference to FIGS. 5(a) to 5(c), the conventional step-like diffraction structure 420 formed in the middle circumferential region will be described. The step-like diffraction structure 420 shown in FIG. 5(a) is a four-level structure. As shown in FIG. 5(a), the conventional structure is designed such that one cycle is formed by steps from the highest portion to the lowest portion in the step-like diffraction structure 420 in the direction perpendicular to the optical axis A.

In the case where the step-like diffraction shape is formed by four levels, the depth of one step is designed to have a distance corresponding to about 1.25 wavelengths for BD light. Although a phase difference caused by one step corresponds to about 1.25 wavelengths for BD light, a phase difference corresponding to an integer multiple of wavelength does not influence formation of a spot. Therefore, this one step is equivalent to a step causing a phase difference corresponding to about 0.25 wavelength for BD light. Here, there are four steps in one cycle, and a phase difference corresponding to about 0.25 wavelength occurs per one step. As a result, as shown in FIG. 5(b), a phase difference corresponding to about 1 wavelength occurs for BD light over one cycle. That is, BD light passing through the middle circumferential region is diffracted at +1st diffraction order.

A distance corresponding to about 1.25 wavelengths for BD light is a distance corresponding to about 0.75 wavelength for DVD light. This is due to the wavelength difference between BD light and DVD light and the difference in refractive index of the optical element. Although a phase difference caused by one step corresponds to about 0.75 wavelength for DVD light, a phase difference corresponding to an integer multiple of wavelength does not influence formation of a spot. Therefore, this one step is equivalent to a step causing a phase difference corresponding to about −0.25 wavelength for DVD light, in the direction opposite to the case of BD light. In the present embodiment, there are four steps in one cycle, and a phase difference corresponding to about −0.25 wavelength occurs per one step. As a result, as shown in FIG. 5(c), a phase difference corresponding to about −1 wavelength occurs for DVD light over one cycle. That is, DVD light is diffracted at −1st diffraction order.

Here, a connection portion C between the step-like diffraction structures 420 will be particularly described. In the case of the conventional structure as shown in FIG. 5(a), at the connection portion C between the step-like diffraction shapes, for both BD light and DVD light, there is almost no phase difference with reference to the phase at the base surface L (see FIGS. 5(b) and 5(c)).

Next, the case where the conventional step-like diffraction structures 410 and 420 are connected will be described.

FIG. 6(a) is a diagram showing the state in which the step-like diffraction structures 410 and 420 shown in FIGS. 4(a) and 5(a) are connected on one optical function surface. Hereinafter, change in phase when BD light and DVD light pass through the conventional structure as shown in FIG. 6(a) will be described.

As described above, both a phase difference caused when DVD light passes through the step-like diffraction structure 410 and a phase difference caused when DVD light passes through the step-like diffraction structure 420 correspond to 1 wavelength. Therefore, as shown in FIG. 6(c), there is no phase difference for DVD light at the connection portion C between the two step-like diffraction structures 410 and 420. In other words, the phases of DVD lights coincide with each other at the connection portion C. That is, DVD lights passing through the two step-like diffraction structures 410 and 420 are emitted with their wavefronts being aligned.

On the other hand, as shown in FIG. 6(b), at the connection portion C, a phase difference corresponding to about 0.5 waveform occurs for BD light. That is, BD light passing through the inner circumferential region and BD light passing through the middle circumferential region have phases substantially opposite to each other. Since lights with opposite phases interfere with each other so as to cancel the intensities of the lights on a spot on a storage surface, a proper spot cannot be formed. Therefore, the performance of the optical element is deteriorated.

Conventionally, different diffraction structures each having a step-like diffraction shape per one cycle are connected between regions of an optical element as described above. Then, a method for substantially aligning wavefronts of light for one wavelength has been considered. However, means for substantially aligning wavefronts for a plurality of lights with different wavelengths such as BD light and DVD light as realized by the objective lens of the present embodiment, has not been considered sufficiently.

Accordingly, the present embodiment provides a design that in the inner circumferential region 201, the number of steps included between top portions of the first diffraction structure 210 is different from the number of steps included between the optical axis A and the top portion of the first diffraction structure 210, that is closest to the optical axis A.

FIG. 7(a) is a diagram showing the first step-like diffraction structure 210 formed in the inner circumferential region 201 and the second step-like diffraction structure 220 formed in the middle circumferential region 202 of the objective lens 200 of the present embodiment.

As shown in FIG. 7(a), the number of steps included between top portions T of the adjacent first step-like diffraction structures 201 is six, and the number of steps included between the optical axis A and a top portion T of the first step-like diffraction structure 210, that is closest to the optical axis A is three.

By providing such a shape per one cycle, the phase difference of BD light at the connection portion C between the inner circumferential region 201 and the middle circumferential region 202 includes a phase difference corresponding to about +0.5 wavelength in the inner circumferential region 201 and a phase difference corresponding to about −0.5 wavelength in the middle circumferential region 202. As a result, at the connection portion C, a phase difference corresponding to about 1 wavelength occurs for BD light. However, as previously described, a phase difference corresponding to an integer multiple of wavelength does not contribute to formation of a spot. Therefore, at the connection portion C, the phases of BD light substantially align with each other, and thus do not become opposite to each other as in the conventional case.

Also in the case of DVD light, similarly, the phase difference of DVD light at the connection portion C correspond to about +0.5 wavelength in the inner circumferential region 201 and correspond to about −0.5 wavelength in the middle circumferential region 202. As a result, at the connection portion C, a phase difference corresponding to about 1 wavelength occurs for DVD light. However, as previously described, a phase difference corresponding to an integer multiple of wavelength does not contribute to formation of a spot. Therefore, at the connection portion C, the phases of DVD light substantially align with each other, and thus do not become opposite to each other as in the conventional case.

By such a configuration, phase alignment can be achieved for lights with two wavelengths, i.e., BD light and DVD light.

By thus designing, an optical element having compatibility among three wavelengths for BD, DVD, and CD and having an excellent light converging performance, can be realized.

In the present embodiment, a method for achieving substantial wavefront alignment for BD light and DVD light has been described. However, the optical element may be designed so as to achieve substantial wavefront alignment also for CD light. In this case, the surface of the optical element is divided into more regions.

In addition, it is desirable that, for light with the wavelength λ1 to be converged onto a first optical disc, a phase difference Φ11 with reference to the phase at a first aspheric surface given by a step in the inner circumferential region 201, that is closest to the middle circumferential region, and a phase difference Φ12 with reference to the phase at a second aspheric surface given by a step in the middle circumferential region, that is closest to the inner circumferential region, satisfy the following expression (1), and for light with the wavelength λ2 to be converged onto a second optical disc, a phase difference Φ21 with reference to the phase at the first aspheric surface given by the step in the inner circumferential region 201 that is closest to the middle circumferential region 202, and a phase difference Φ22 with reference to the phase at the second aspheric surface given by the step in the middle circumferential region 202 that is closest to the inner circumferential region, satisfy the following expression (2). Also by such a configuration, phase alignment can be achieved for lights with two wavelengths, i.e., BD light and DVD light.

$$-0.25 < (\Phi 11 + \Phi 12) - N1 < 0.25 \quad (1)$$

$$-0.25 < (\Phi 21 + \Phi 22) - N2 < 0.25 \quad (2)$$

where,

N1 is an integer obtained by rounding the first decimal place of a numerical value given by Φ11+Φ12, and N2 is an integer obtained by rounding the first decimal place of a numerical value given by Φ21+Φ22.

Further, if the height of the step in the inner circumferential region 201 that is closest to the middle circumferential region, from the first aspheric surface in the optical axis direction, is set as d1, and the height of the step in the middle circumferential region that is closest to the inner circumferential region, from the second aspheric surface in the optical axis direction, is set as d2, $\Phi 11$, $\Phi 12$, $\Phi 21$, and $\Phi 22$ can be represented by the following expressions (3) to (6).

$$\Phi 11 = d1 \times \cos\{s1/(0.2 \times f+1.1)\} \times (n1-1)/\lambda 1 \quad (3)$$

$$\Phi 12 = d2 \times \cos\{s2/(0.2 \times f+1.1)\} \times (n1-1)/\lambda 1 \quad (4)$$

$$\Phi 21 = d1 \times \cos\{s1/(0.2 \times f+1.1)\}(n2-1)/\lambda 2 \quad (5)$$

$$\Phi 22 = d2 \cos\{s2/(0.2 \times f+1:1)\} \times (n2-1)/\lambda 2 \quad (6)$$

where, s1 is an inclination angle [degree] made by the step positioned at the end (the outermost) of the inner circumferential region with respect to a plane perpendicular to the optical axis A, s2 is an inclination angle [degree] made by the step positioned at the start (the innermost) of the middle circumferential region with respect to a plane perpendicular to the optical axis A, f is a focal length [mm] of the objective lens, n1 is a refractive index of the optical element in the case of wavelength $\lambda 1$, and n2 is a refractive index of the optical element in the case of wavelength $\lambda 2$.

Figure 8:
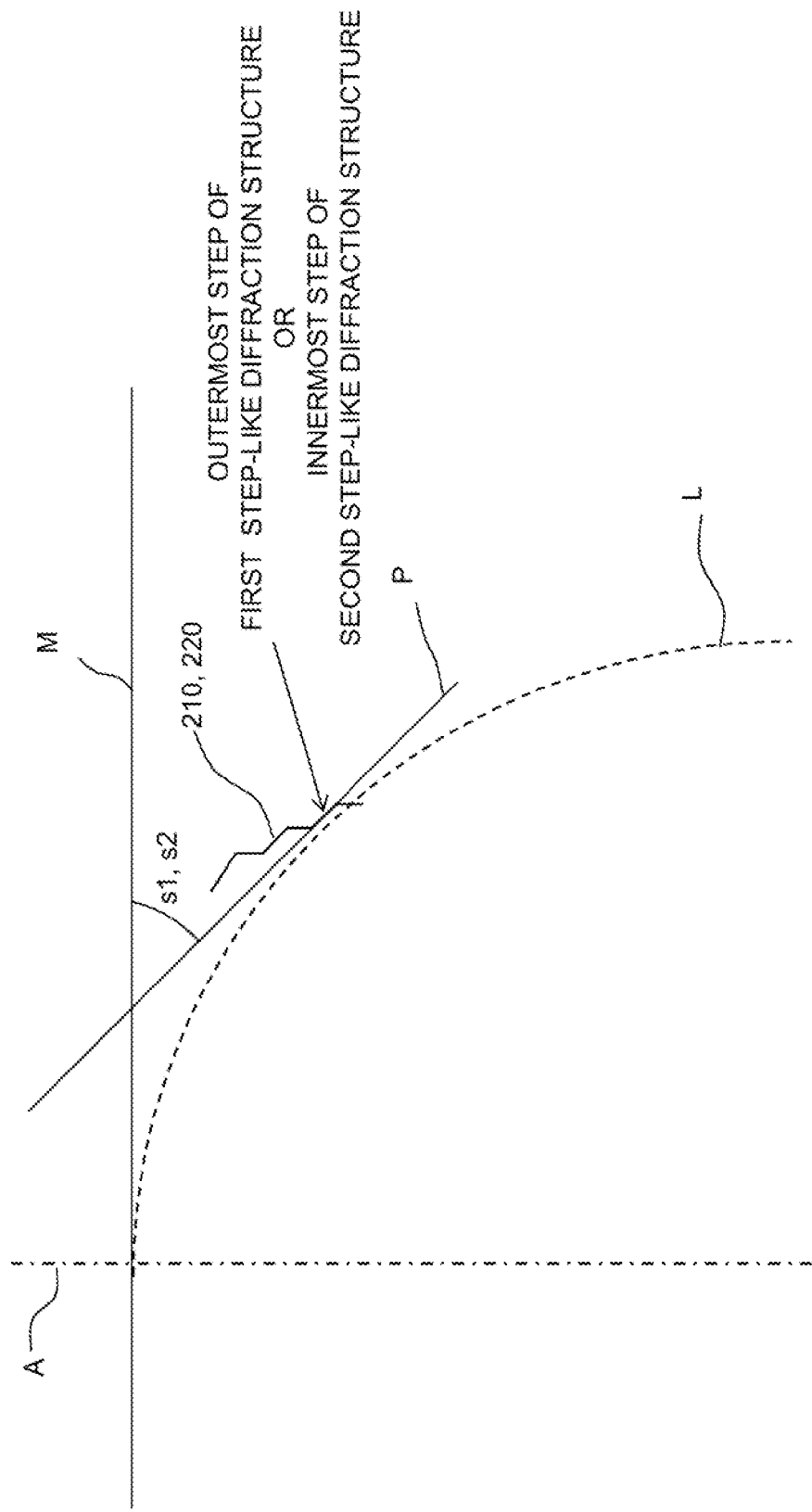
FIG. 8 is a diagram for explaining an inclination angle made by the outermost step of the step-like diffraction structure with respect to a plane perpendicular to the optical axis.

FIG. 8 is a diagram for explaining an inclination angle made by the outermost step of the step-like diffraction structure with respect to a plane perpendicular to the optical axis. In FIG. 8, L denotes the base surface (aspheric surface), M denotes a plane perpendicular to the optical axis, and P denotes a plane including the outer surface of the outermost step of the first step-like diffraction structure 210 or the innermost step of the second step-like diffraction structure. The above angles s1 and s2 are values defined as shown in FIG. 8.

Second Embodiment

Next, an optical head apparatus 500 according to the second embodiment will be described. The optical head 100 of the first embodiment has compatibility among three wavelengths. The optical head apparatus 500 of the present embodiment is different from the optical head 100 of the first embodiment in that the optical head apparatus 500 has compatibility between two wavelengths.

In addition, an objective lens 600 of the present embodiment can correct aberration for two wavelengths of BD light and DVD light. The inner circumferential region 210 and the middle circumferential region 220 of the objective lens 200 of the first embodiment can be directly applied to the optical function surface of the objective lens 600.

That is, an inner circumferential region 601 of the objective lens 600 corresponds to the inner circumferential region 201 of the objective lens 200. In addition, an outer circumferential region 602 of the objective lens 600 corresponds to the middle circumferential region 202 of the objective lens 200. The inner circumferential region 601 of the objective lens 600 is an example of the first region. In addition, the outer circumferential region 602 of the objective lens 600 is an example of the second region.

2-1. Optical Head Apparatus

Hereinafter, the optical head apparatus 500 will be described.

Figure 9:
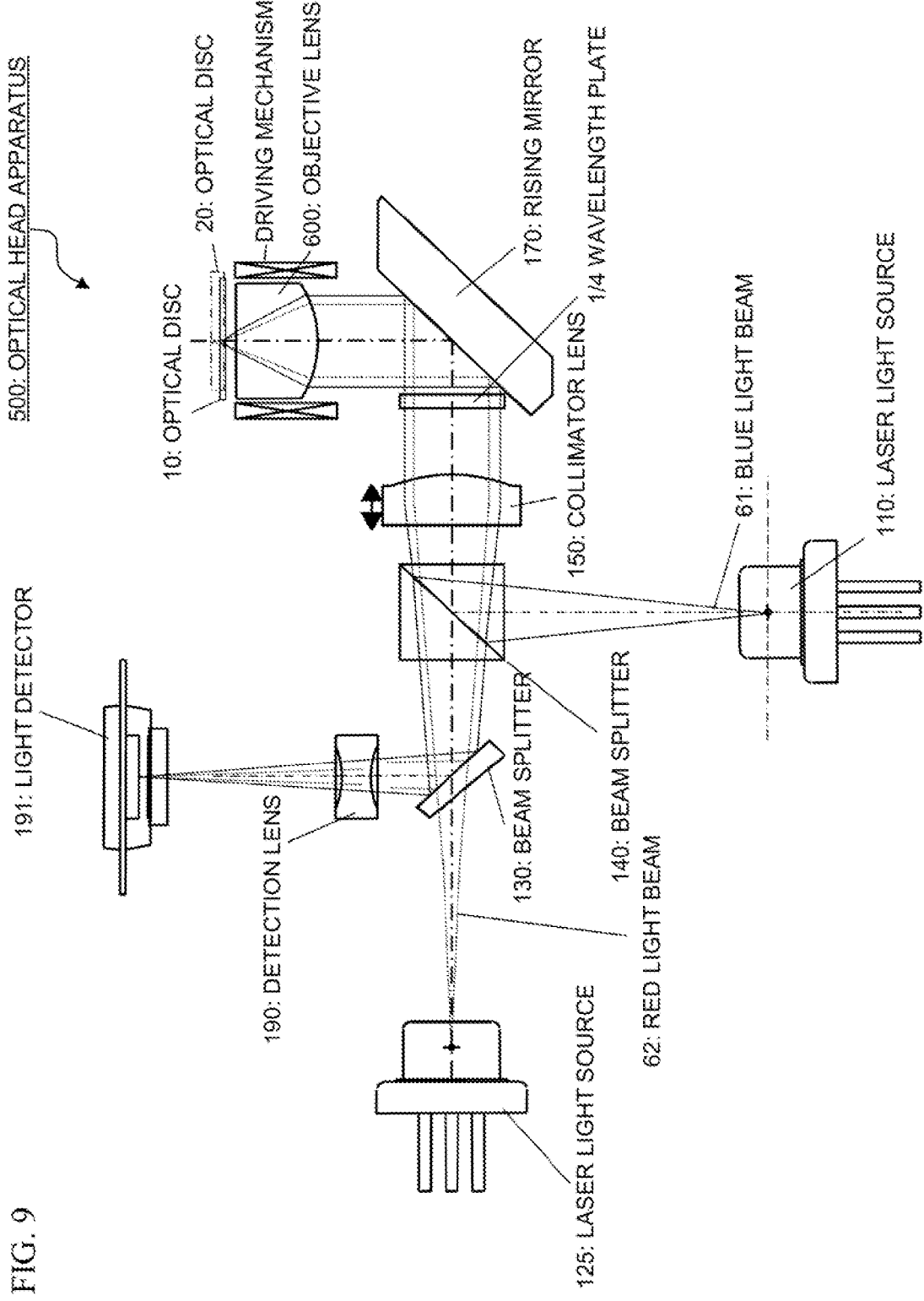
FIG. 9 is a schematic configuration diagram of an optical head apparatus of the second embodiment.

FIG. 9 is a schematic configuration diagram of the optical head apparatus 500.

Flow of light of the blue light beam 61 is the same as in the first embodiment, and therefore the description thereof is omitted.

A laser light source 125 emits the red light beam 62 with the wavelength $\lambda 2$. The wavelength $\lambda 2$ is 600 to 800 nm. Specifically, in the present embodiment, light with a wavelength of 600 to 700 nm which complies with DVD standard is used. More specifically, light with a wavelength of 680 nm or close thereto is used. The red light beam 62 emitted from the laser light source 125 passes through the beam splitter 140 and then the beam splitter 130, and enters the collimator lens 150, to be converted into diverging light. The collimator lens 150 can adjust the parallelism of the light flux of the red light beam 62 by moving in the optical axis direction. In addition, similarly to the case of using the optical disc 10, the collimator lens 150 corrects spherical aberration due to the difference in disc base material thickness, temperature variation, wavelength variation, or the like by moving in the optical axis direction. The red light beam 62 having passed through the collimator lens 150 is, as diverging light, reflected by the rising mirror 170, enters the objective lens 600, and then is converged onto an information storage surface of the optical disc 20, to form a proper spot thereon. The red light beam 62 reflected by the information storage surface of the optical disc 11 passes through the objective lens 600 again, is reflected by the rising mirror 170, and passes through the collimator lens 150 and then the beam splitter 130. The red light beam 62 emitted from the beam splitter 130 is reflected by the beam splitter 140, and then converged onto the light detector 191 by the detection lens 190, to be detected as an optical signal.

2-2. Objective Lens

Figure 10:
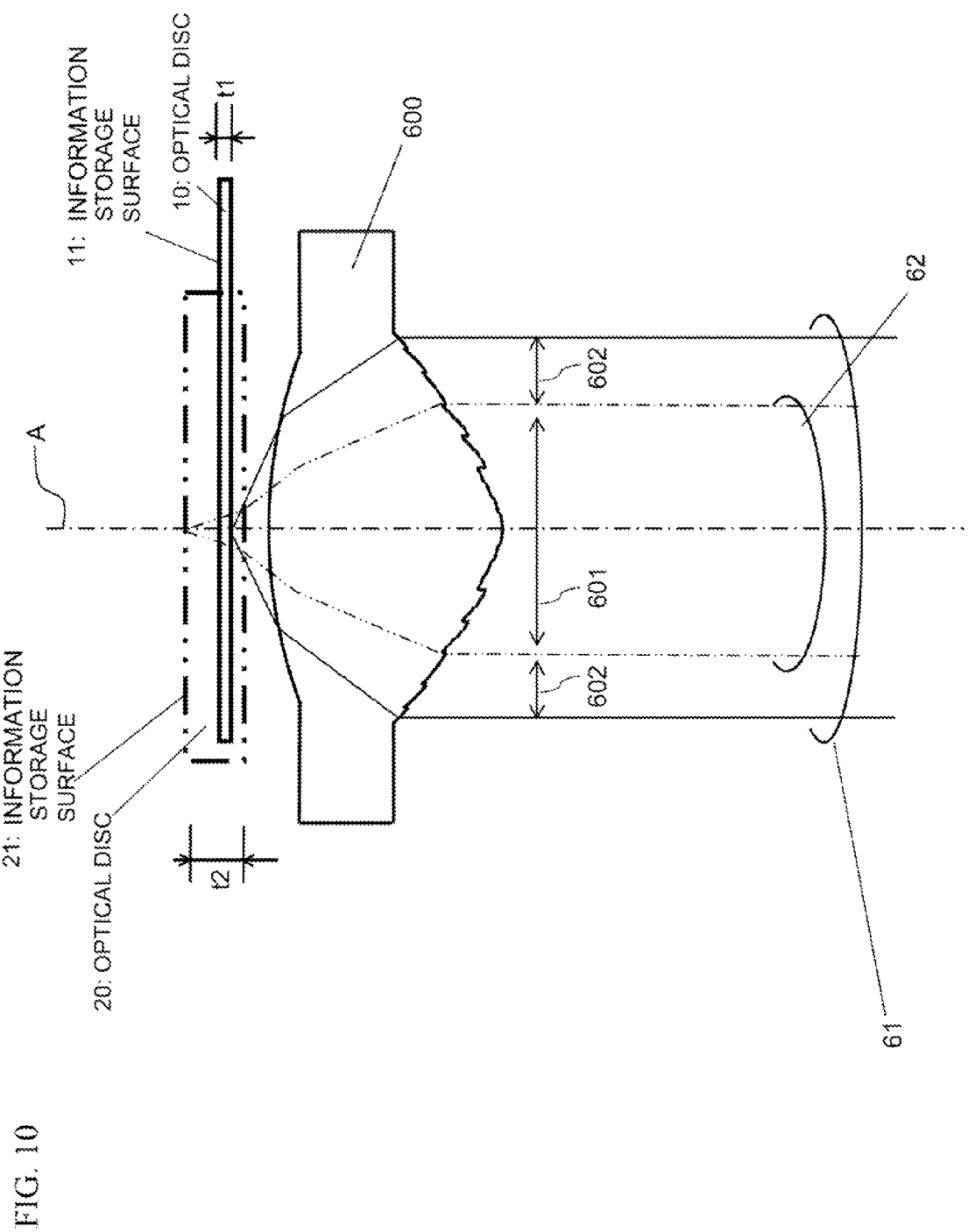
FIG. 10 is a schematic sectional view of an objective lens of the second embodiment.

Next, the objective lens 600 of the present embodiment will be described. FIG. 10 is a schematic sectional view of the objective lens 600 of the present embodiment.

An optical function surface on the incident side of the objective lens 600 is divided into two regions centered on the optical axis, that is, an inner circumferential region 601 including the optical axis A and a ring-shaped outer circumferential region 602 surrounding the inner circumferential region 601. A first step-like diffraction structure corresponding to the first step-like diffraction structure 210 of the first embodiment is provided in the inner circumferential region 601. A second step-like diffraction structure corresponding to the second step-like diffraction structure 220 of the first embodiment is provided in the outer circumferential region 602. Both the inner circumferential region 601 and the outer circumferential region 602 are regions which contribute to spot formation of lights with two wavelengths for BD and DVD.

The optical functions, the shapes in one cycle, and the phase difference at the connection portion of the first step-like diffraction structure and second step-like diffraction structure in the second embodiment are the same as those in the first embodiment. Therefore, the repetitive description thereof is omitted.

Other Embodiments

In the above embodiments, examples where a sawtooth concave-convex structure is provided on the aspheric surface of the objective lens have been described. However, the present disclosure can be also applied, in the same manner, to an optical element in which a sawtooth concave-convex structure is provided on a planer plate. In this case, as described in the above embodiments, a plurality of different sawtooth shapes may be arranged.

EXAMPLES

Hereinafter, numerical examples of the optical element according to the present disclosure will be described by using construction data and specific values of diffraction efficiency. It is noted that in each numerical examples, a surface for which an aspheric surface coefficient is given represents a refraction optical surface having an aspheric surface shape or a surface (for example, a diffraction surface) having a refraction function equivalent to an aspheric surface. The surface shape of an aspheric surface is defined by the following expression (7).

$$X = \frac{C_j h^2}{1 + \sqrt{1-(1+k_j)C_j^2 h^2}} + \sum A_{j,n} h^n \quad (7)$$

where,

X is a distance from a tangential plane at a top of an aspheric surface, to a point on the aspheric surface at a height h from the optical axis, h is the height from the optical axis, Cj is the curvature (Cj=1/Rj) of an aspheric surface at the top, of the j-th surface of the lens, kj is a conic constant of the j-th surface of the lens, and Aj,n is an n-th order aspheric surface constant of the j-th surface of the lens.

In addition, a phase difference caused by a diffraction structure provided on the optical surface is given by the following expression (8).

$$\phi(h) = M \Sigma P_{j,m} h^{2m} \quad (8)$$

where,

φ(h) is a phase function, h is the height from the optical axis,

Pj,m is a 2m-th order phase function coefficient of the j-th surface of the lens, and M is a diffraction order.

Figure 7:
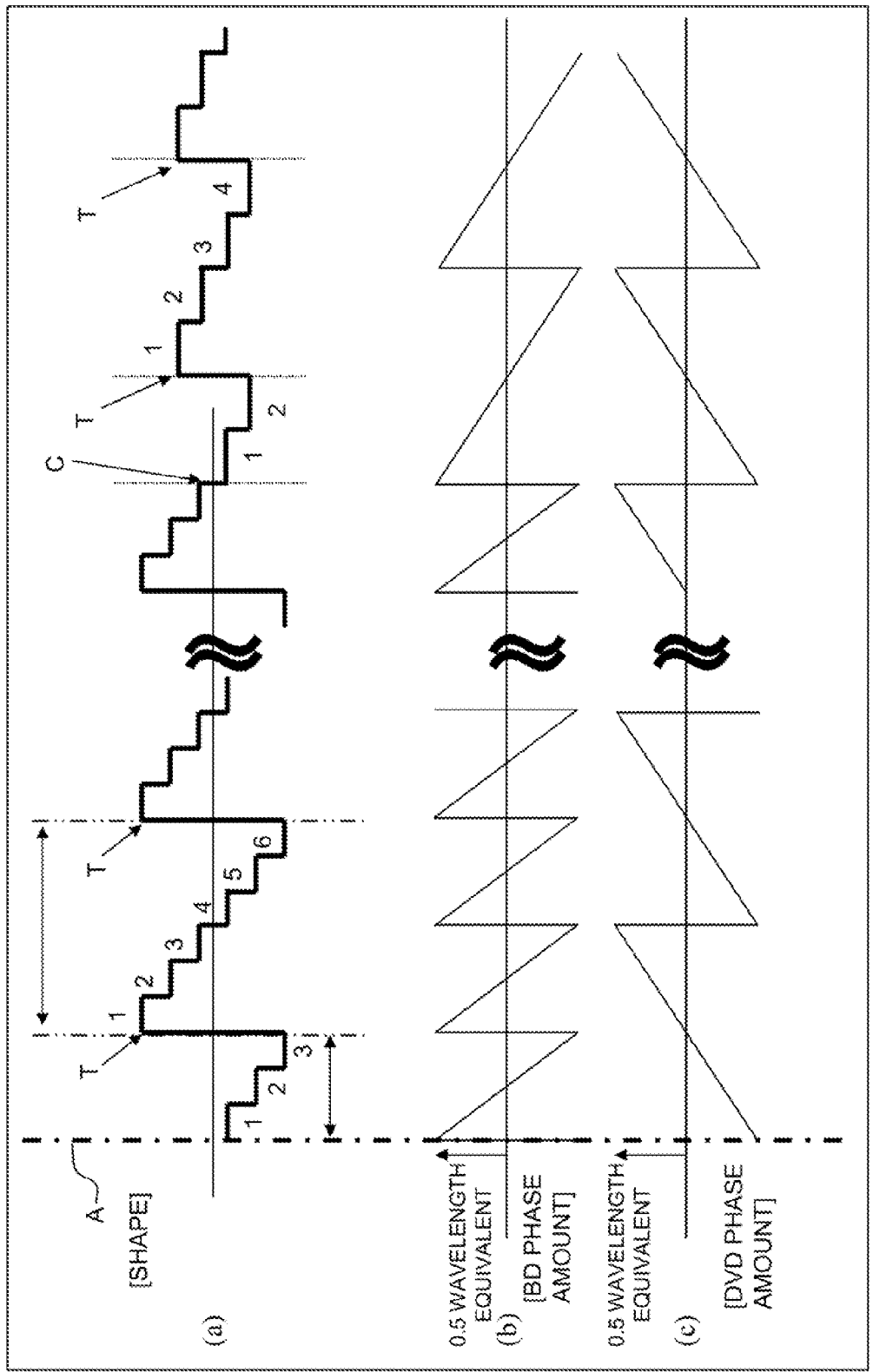
FIG. 7(a) is a diagram showing a first step-like diffraction structure formed in an inner circumferential region and a second step-like diffraction structure formed in a middle circumferential region of an objective lens 200 of the present embodiment.
FIG. 7(b) is a diagram for explaining a phase difference given for BD light by the step-like diffraction structure of the present embodiment.
FIG. 7(c) is a diagram for explaining a phase difference given for DVD light by the step-like diffraction structure of the present embodiment.
Figure 11:
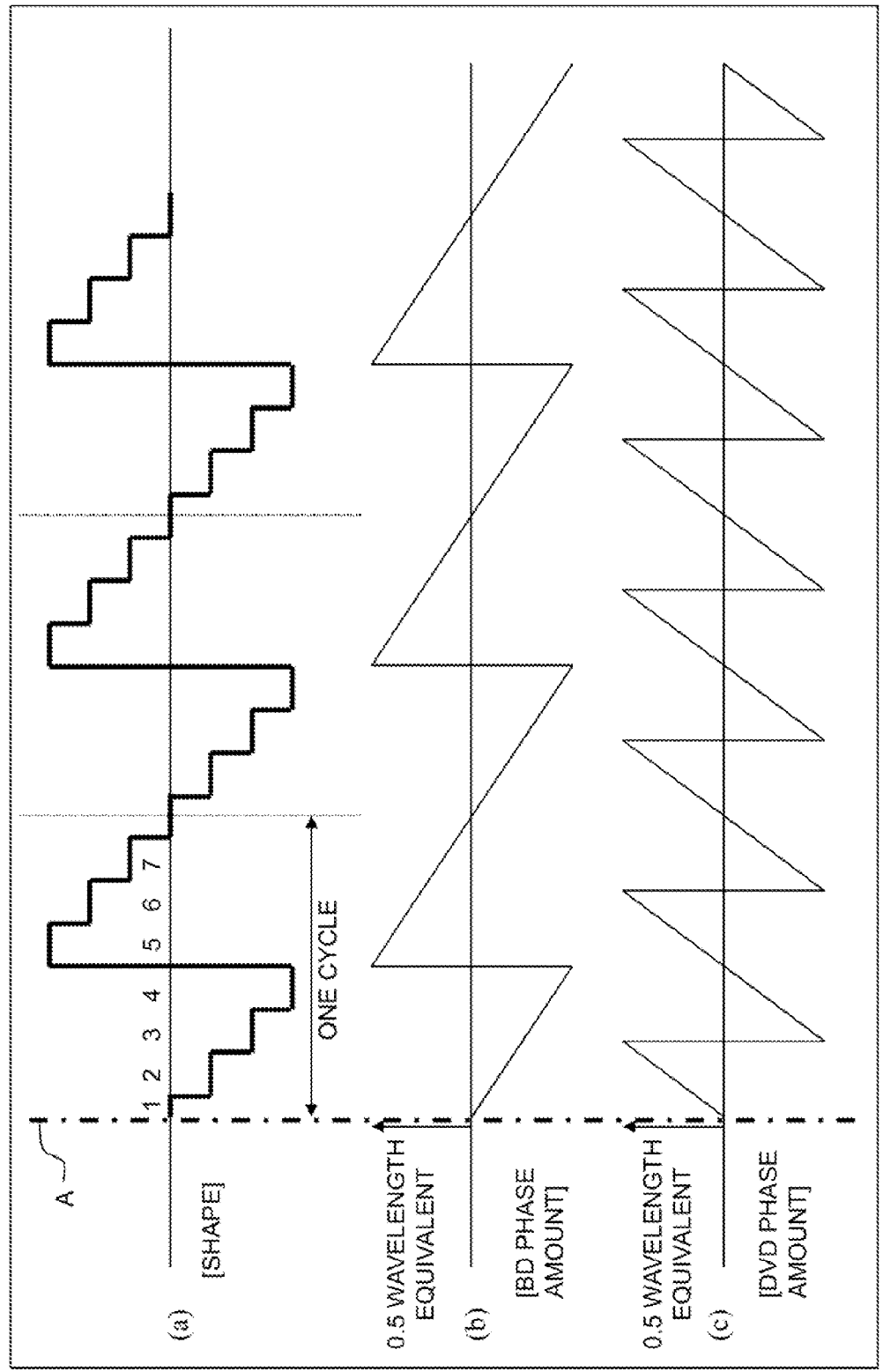
FIG. 11 is a schematic configuration showing a diffraction structure in an inner circumferential region of an objective lens of example 2.

FIGS. 7, 11, and 13 show partial enlarged diagrams of the optical surfaces of objective lens elements of examples 1 to 3. Specifically, FIGS. 7, 11, and 13 are enlarged diagrams of a compatibility region formed by the inner circumferential region and the middle circumferential region. In these examples, in each figure, a portion under the optical surface is a lens material, and a portion above the diffraction structure is air.

Example 1

Example 1 corresponds to embodiment 1. The first surface of an objective lens according to example 1 is divided into an inner circumferential region including a symmetry axis, a middle circumferential region surrounding the inner circumferential region, and an outer circumferential region surrounding the middle circumferential region. On the first surface, a six-level step-like diffraction structure is provided in the inner circumferential region, a four-level step-like diffraction structure is provided in the middle circumferential region, and a sawtooth diffraction structure is provided in the outer circumferential region. On the second surface, an aspheric surface is provided. The objective lens according to example 1 is a BD/DVD/CD compatible lens. The design values for BD are such that the wavelength is 408 nm, the focal length is 1.5 mm, and the protection layer thickness of an information storage medium is 0.1 mm. The design values for DVD are such that the wavelength is 660 nm, the focal length is 1.78 mm, and the protection layer thickness of an information storage medium is 0.6 mm. The design values for CD are such that the wavelength is 785 nm, the focal length is 1.94 mm, and the protection layer thickness of an information storage medium is 1.2 mm.

Tables 1 and 2 show construction data of the objective lens element according to example 1.

TABLE 1

|  | BD | DVD | CD |
|---|---|---|---|
| Wavelength [μm] | 0.408 | 0.660 | 0.785 |
| Aperture [mm] | 2.58 | 2.10 | 1.78 |
| Working distance (WD) [mm] | 0.51 | 0.44 | 0.30 |
| Disc thickness (DT) [mm] | 0.0875 | 0.60 | 1.20 |
| Focal length [mm] | 1.50 | 1.77 | 1.91 |
| Diffraction order of inner circumferential region of first surface | 2 | −1 | −2 |
| Diffraction order of middle circumferential region of first surface | 1 | −1 |  |
| Object point (OP) [mm] | ∞ | −320 | +80 |

| Surface number | Curvature radius[mm] at top | Thickness [mm] | Material | Remarks |
|---|---|---|---|---|
| 0 |  | OP |  |  |
| 1 | 1.0168315 | 1.743595 | n1 | Inner circumferential region (diffraction structure) Middle circumferential region (diffraction structure) Outer circumferential region (sawtooth structure) |

TABLE 1-continued

| 2 | −2.211001 | WD | | Aspheric surface |
|---|---|---|---|---|
| 3 | ∞ | DT | disk | Planar surface |
| 4 | ∞ | | | Planar surface |
| Wavelength [mm] | 0.408 | 0.660 | 0.785 | |
| Refractive Index (n1) | 1.52196 | 1.50413 | 1.50072 | |
| Refractive Index (Disk) | 1.61642 | 1.57815 | 1.57203 | |

TABLE 2

| | First surface | | | |
|---|---|---|---|---|
| | Inner circumferential region | Middle circumferential region | Outer circumferential region | Second surface |
| Region [mm] | 0 to 0.899 | 0.899 to 1.050 | 1.050 to 1.290 | |
| | Aspheric surface coefficient | | | |
| R | 1.016831500 | 1.196784100 | 62.642431000 | −2.211001000 |
| k | −0.059957083 | −0.468827630 | 2201.118600000 | 2.657332000 |
| A0 | 0.000000000 | 0.052879147 | 0.291332300 | 0.000000000 |
| A2 | 0.000000000 | 0.000000000 | 0.000000000 | 0.000000000 |
| A4 | −0.048732093 | −0.552770290 | −0.068081799 | 0.430721210 |
| A6 | −0.061809109 | 1.572520100 | 0.484378040 | −0.486839120 |
| A8 | 0.060706585 | −0.683873130 | 0.052023048 | 0.720530200 |
| A10 | −0.072204312 | −1.957002600 | −0.177819320 | −0.206799080 |
| A12 | −0.232174910 | 3.033997000 | −0.058286121 | −1.589700500 |
| A14 | 0.432538060 | −1.739820500 | 0.009359239 | 2.337625400 |
| A16 | −0.253465040 | 0.410218740 | 0.056259303 | −0.939206510 |
| A18 | 0.000000000 | −0.023203651 | −0.018347466 | −0.275230250 |
| A20 | 0.000000000 | 0.000000000 | 0.006868114 | 0.264829680 |
| A22 | 0.000000000 | 0.000000000 | −0.004113365 | −0.035933557 |
| | Phase function | | | |
| P2 | −175.69611 | −269.5579 | −59.401984 | |
| P4 | −13.589417 | 153.50601 | −120.74307 | |
| P6 | 8.5432791 | −53.439172 | 22.418402 | |

In the inner circumferential region of example 1, one annular zone cycle is formed by six levels of steps. In each annular zone, steps are defined as the first step, the second step, the third step, . . . , the sixth step, in order from the optical axis side to the outer side. The depth of each step forming one cycle of the step-like diffraction structure is designed so as to give a phase difference corresponding to about 1.33 wavelengths for light with a design wavelength for BD, and the depth between the third step and the fourth step is designed so as to give a phase difference corresponding to about 6.65 wavelengths in the opposite direction.

Here, the depth of a step refers to the height present between the adjacent steps in the direction parallel to the optical axis, as shown by an arrow in FIG. 7.

In the middle circumferential region of example 1, one annular zone cycle is formed by four levels of steps. In each annular zone, steps are defined as the first step, the second step, the third step, and the fourth step, in order from the optical axis side to the outer side. The height of each step forming one cycle of the step-like diffraction structure is designed so as to give a phase difference corresponding to about 1.25 wavelengths for light with a design wavelength for BD, and the height between the second step and the third step is designed so as to give a phase difference corresponding to about 3.75 wavelengths in the opposite direction.

In the present example, the number of steps included between top portions of the first diffraction structure is six, and the number of steps included between the optical axis and a top portion of the first diffraction structure, that is closest to the optical axis, is three.

A phase difference with reference to the phase at the aspheric surface in the inner circumferential region given by a step in the inner circumferential region, that is closest to the middle circumferential region, corresponds to about 0.66 wavelength for BD light, and about 0.42 wavelength for DVD light. In addition, a phase difference with reference to the phase at the aspheric surface in the middle circumferential region given by a step in the middle circumferential region, that is closest to the inner circumferential region, corresponds to about −0.625 wavelength for BD light, and about −0.375 wavelength for DVD light. The height of the step in the inner circumferential region that is closest to the middle circumferential region, from the aspheric surface in the inner circumferential region in the optical axis direction, is about 0.63 µm. The height of the step in the middle circumferential region that is closest to the inner circumferential region, from the aspheric surface in the middle circumferential region in the optical axis direction, is about 0.72 µm. An inclination angle made by the step in the inner circumferential region that is closest to the middle circumferential region, with respect to a plane perpendicular to the optical axis, is about 49.0 degree. An inclination angle made by the step in the middle circumferential region that is closest to the inner circumferential region, with respect to a plane perpendicular to the optical axis, is about 49.1 degree.

By such a configuration, for BD light, in the vicinity of the connection portion C between the inner circumferential region and the middle circumferential region, a phase difference corresponding to about +0.5 wavelength occurs on the inner circumferential region side and a phase difference corresponding to about −0.5 wavelength occurs on the middle circumferential region side. As a result, at the connection portion C, a phase difference corresponding to about 1 wavelength occurs for BD light. However, as previously described, a phase difference corresponding to an integer multiple of wavelength does not contribute to formation of a spot. Therefore, at the connection portion C, the phases of BD light substantially align with each other, and thus do not become opposite to each other as in the conventional case.

Similarly, also for DVD light, in the vicinity of the connection portion C between the inner circumferential region and the middle circumferential region, a phase difference corresponding to about +0.5 wavelength occurs on the inner circumferential region side and a phase difference corresponding to about −0.5 wavelength occurs on the middle circumferential region side. As a result, at the connection portion C, a phase difference corresponding to about 1 wavelength occurs for DVD light. However, as previously described, a phase difference corresponding to an integer multiple of wavelength does not contribute to formation of a spot. Therefore, at the connection portion C, the phases of DVD light substantially align with each other, and thus do not become opposite to each other as in the conventional case.

By thus designing, an optical element having compatibility among three wavelengths for BD, DVD, and CD and having an excellent light converging performance, can be realized.

Example 2

Figure 12:
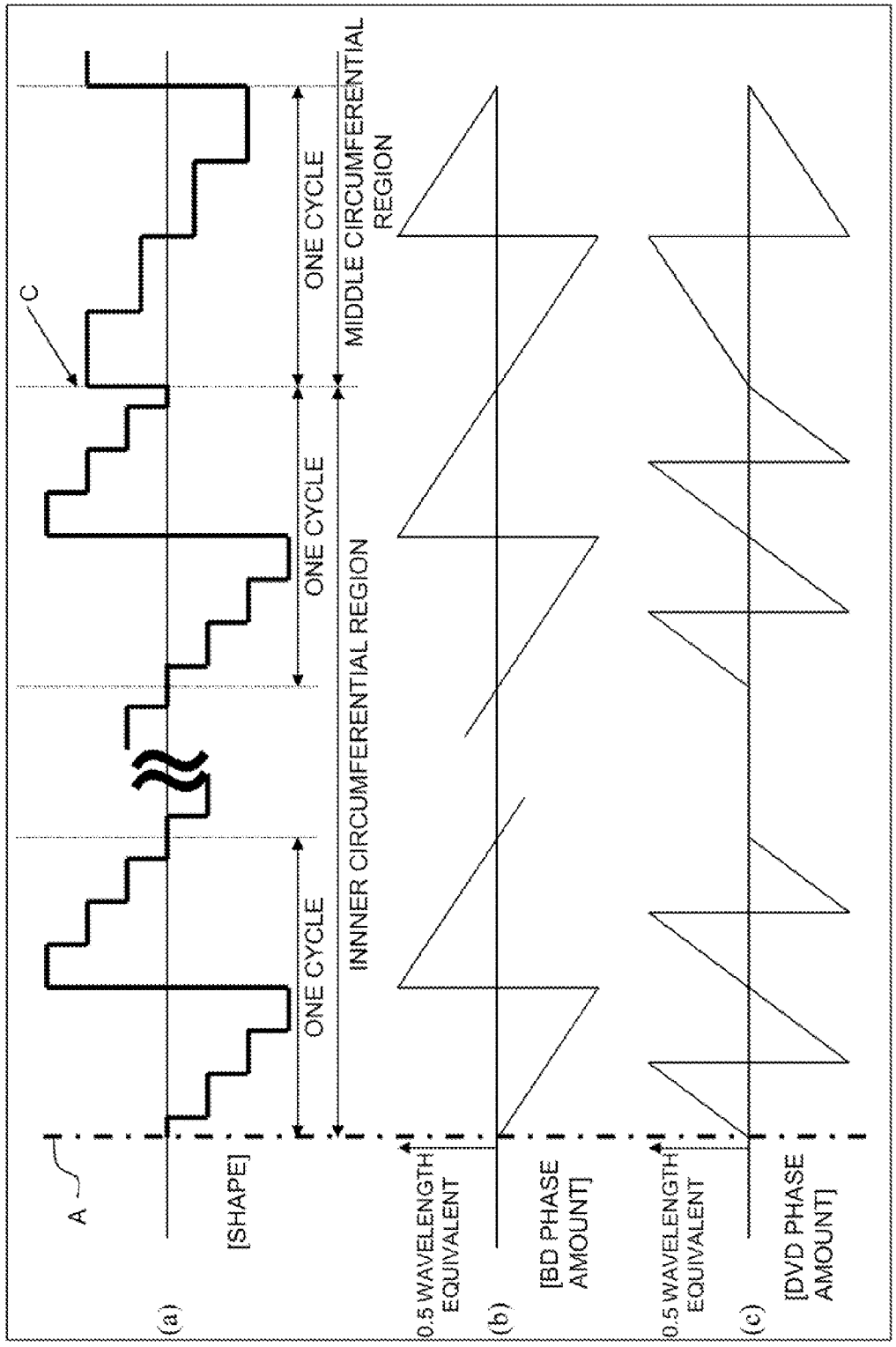
FIG. 12 is a schematic configuration showing a diffraction structure of the objective lens of example 2.

FIGS. 11 and 12 are schematic diagrams for explaining an objective lens of example 2.

The first surface of an objective lens according to example 2 is divided into an inner circumferential region including a symmetry axis, a middle circumferential region surrounding the inner circumferential region, and an outer circumferential region surrounding the middle circumferential region. On the first surface, a seven-level step-like diffraction structure is provided in the inner circumferential region, a four-level step-like diffraction structure is provided in the middle circumferential region, and a sawtooth concave-convex structure is provided in the outer circumferential region. On the second surface, an aspheric surface is provided. The objective lens element according to example 2 is a BD/DVD/CD compatible lens. The design values for BD are such that the wavelength is 408 nm, the focal length is 1.5 mm, and the protection layer thickness of an information storage medium is 0.1 mm. The design values for DVD are such that the wavelength is 660 nm, the focal length is 1.78 mm, and the protection layer thickness of an information storage medium is 0.6 mm. The design values for CD are such that the wavelength is 785 nm, the focal length is 1.94 mm, and the protection layer thickness of an information storage medium is 1.2 mm.

Tables 3 and 4 show construction data of the objective lens element according to example 2.

TABLE 3

|  | BD | DVD | CD |
| --- | --- | --- | --- |
| Wavelength [μm] | 0.408 | 0.660 | 0.785 |
| Aperture [mm] | 2.58 | 2.23 | 1.74 |
| Working distance (WD) [mm] | 0.51 | 0.44 | 0.30 |
| Disc thickness (DT) [mm] | 0.0875 | 0.60 | 1.20 |
| Focal length [mm] | 1.50 | 1.71 | 1.84 |
| Diffraction order of inner circumferential region of first surface | 1 | −2 | −3 |
| Diffraction order of middle circumferential region of first surface | 1 | −1 |  |
| Object point (OP) [mm] | ∞ | −200 | +80 |

| Surface number | Curvature radius[mm] at top | Thickness [mm] | Material | Remarks |
| --- | --- | --- | --- | --- |
| 0 |  | OP |  |  |
| 1 | 0.9548867 | 1.679413 | n1 | Inner circumferential region (diffraction structure) Middle circumferential region (diffraction structure) Outer circumferential region (sawtooth structure) |
| 2 | −1.916574 | WD |  | Aspheric surface |
| 3 | ∞ | DT | disk | Planar surface |
| 4 | ∞ |  |  | Planar surface |
| Wavelength [μm] | 0.408 | 0.660 | 0.785 |  |
| Refractive Index (n1) | 1.52196 | 1.50413 | 1.50072 |  |
| Refractive Index (disk) | 1.61642 | 1.57815 | 1.57203 |  |

TABLE 4

| | First surface | | | |
| --- | --- | --- | --- | --- |
|  | Inner circumferential region | Middle circumferential region | Outer circumferential region | Second surface |
| Region [mm] | 0 to 0.879 | 0.879 to 1.109 | 1.109 to 1.290 |  |

TABLE 4-continued

| | First surface | | | |
|---|---|---|---|---|
| | Inner circumferential region | Middle circumferential region | Outer circumferential region | Second surface |
| Aspheric surface coefficient | | | | |
| R | 0.954886690 | 1.050173500 | 0.000000000 | −1.916574000 |
| k | −0.514397030 | −0.906343730 | 0.000000000 | 0.111983800 |
| A0 | 0.000000000 | 0.048399371 | 0.168084790 | 0.000000000 |
| A2 | 0.000000000 | 0.000000000 | 0.000000000 | 0.000000000 |
| A4 | 0.003839956 | −0.468142930 | 0.551911990 | 1.002515600 |
| A6 | 0.049291376 | 1.440566400 | 0.043165362 | −5.263775300 |
| A8 | −0.169537050 | −0.601410790 | −0.241263420 | 20.747429000 |
| A10 | 0.318247310 | −1.978802400 | 0.067971277 | −48.077037000 |
| A12 | −0.517664380 | 3.028613200 | 0.002051033 | 62.934789000 |
| A14 | 0.688346170 | −1.668114300 | 0.118087480 | −42.382030000 |
| A16 | −0.560851720 | 0.336289250 | −0.089132000 | 9.828692500 |
| A18 | 0.194248030 | −0.001939013 | −0.028052205 | −0.242825270 |
| A20 | 0.000000000 | 0.000000000 | 0.030547828 | 5.726517400 |
| A22 | 0.000000000 | 0.000000000 | 0.001220196 | −5.477440900 |
| A24 | 0.000000000 | 0.000000000 | −0.002660173 | 1.428294700 |
| A26 | 0.000000000 | 0.000000000 | 0.000000915 | 0.000000000 |
| A28 | 0.000000000 | 0.000000000 | 0.000000000 | 0.000000000 |
| A30 | 0.000000000 | 0.000000000 | 0.000000000 | 0.000000000 |
| Phase function | | | | |
| P2 | −167.04894 | −49.297559 | −121.73274 | |
| P4 | 52.01022 | −192.76259 | 24.893198 | |
| P6 | −167.73013 | 53.243848 | −75.781159 | |
| P8 | 189.87474 | 0 | 0 | |
| P10 | −75.581819 | 0 | 0 | |

As shown in FIG. 11, in the inner circumferential region of the objective lens of example 2, one annular zone cycle is formed by seven levels of steps which are continuously formed. In each annular zone, steps are defined as the first step, the second step, the third step, . . . , the seventh step, in order from the optical axis side to the outer side.

In FIG. 11, eight steps are present in one cycle, and a step corresponding to the eighth step is a step that gives the same phase difference as the first step. In the case where this diffraction structure is formed in the inner circumferential region, the step corresponding to the eighth step coincides with the first step of the adjacent diffraction shape, so that the eighth step and the first step cannot be distinguished from each other in the whole region. Therefore, this diffraction shape can be regarded as a seven-level step-like diffraction shape.

In other words, one cycle of this first diffraction structure corresponds to a range from a middle portion to the next middle portion of diffraction shapes whose one cycle is formed by a seven-level step-like shape that monotonously decreases.

The depth of each step forming one cycle of the step-like diffraction structure is designed so as to give a phase difference corresponding to about 1.14 wavelengths for light with a design wavelength for BD, and the depth between the fourth step and the fifth step is designed so as to give a phase difference corresponding to about 6.84 wavelengths in the opposite direction.

In the middle circumferential region of example 2, one annular zone cycle is formed by four levels of steps which are continuously formed. In each annular zone, steps are defined as the first step, the second step, the third step, and the fourth step, in order from the optical axis side to the outer side. The height of each step forming one cycle of the step-like diffraction structure is designed so as to give a phase difference corresponding to about 1.25 wavelengths for light with a design wavelength for BD, and the height between the second step and the third step is designed so as to give a phase difference corresponding to about 3.75 wavelengths in the opposite direction.

A phase difference with reference to the phase at the aspheric surface in the inner circumferential region given by a step in the inner circumferential region, that is closest to the middle circumferential region is about 0 wavelength for BD light, and about 0 wavelength for DVD light. In addition, a phase difference with reference to the phase at the aspheric surface in the middle circumferential region given by a step in the middle circumferential region, that is closest to the inner circumferential region, is about 1.875 wavelength for BD light, and about −1.125 wavelength for DVD light. The height of the step in the inner circumferential region that is closest to the middle circumferential region, from the aspheric surface in the inner circumferential region in the optical axis direction, is about 0 μm. The height of the step in the middle circumferential region that is closest to the inner circumferential region, from the aspheric surface in the middle circumferential region in the optical axis direction, is about 1.82 μm. An inclination angle made by the step in the inner circumferential region that is closest to the middle circumferential region, with respect to a plane perpendicular to the optical axis, is about 49.8 degree. An inclination angle made by the step in the middle circumferential region that is closest to the inner circumferential region, with respect to a plane perpendicular to the optical axis, is about 49.7 degree.

In the present example, the number of steps included between top portions of the first diffraction structure is seven, and the number of steps included between the optical axis and a top portion of the first diffraction structure, that is closest to the optical axis, is four.

By such a configuration, for each of BD light and DVD light, the phases substantially align with each other at the connection portion C between the inner circumferential region and the middle circumferential region.

By thus designing, an optical element having compatibility among three wavelengths for BD, DVD, and CD and having an excellent light converging performance, can be realized.

Example 3

FIGS. 13 and 14 are schematic diagrams for explaining an objective lens of example 3.

The first surface of an objective lens according to example 3 is divided into an inner circumferential region including a symmetry axis, a middle circumferential region surrounding the inner circumferential region, and an outer circumferential region surrounding the middle circumferential region. On the first surface, a nine-level step-like diffraction structure is provided in the inner circumferential region, a four-level step-like diffraction structure is provided in the middle circumferential region, and a sawtooth diffraction structure is provided in the outer circumferential region. On the second surface, an aspheric surface is provided. The objective lens according to example 3 is a BD/DVD/CD compatible lens. The design values for BD are such that the wavelength is 408 nm, the focal length is 1.5 mm, and the protection layer thickness of an information storage medium is 0.1 mm. The design values for DVD are such that the wavelength is 660 nm, the focal length is 1.78 mm, and the protection layer thickness of an information storage medium is 0.6 mm. The design values for CD are such that the wavelength is 785 nm, the focal length is 1.94 mm, and the protection layer thickness of an information storage medium is 1.2 mm.

Tables 5 and 6 show construction data of the objective lens element according to example 3.

TABLE 5

|  | BD | DVD | CD |
| --- | --- | --- | --- |
| Wavelength [μm] | 0.408 | 0.66 | 0.785 |
| Aperture [mm] | 2.75 | 2.36 | 1.85 |
| Working distance (WD) [mm] | 0.51 | 0.45 | 0.3 |
| Disc thickness (DT) [mm] | 0.0875 | 0.6 | 1.2 |
| Focal length [mm] | 1.6 | 1.93 | 2.06 |
| Diffraction order of inner circumferential region of first surface | 1 | −3 | −4 |
| Diffraction order of middle circumferential region of first surface | 1 | −1 |  |
| Object point (OP) [mm] | ∞ | −120 | 80 |

| Surface number | Curvature radius[mm] at top | Thickness [mm] | Material | Remarks |
| --- | --- | --- | --- | --- |
| 0 |  | OP |  |  |
| 1 | 1.0449293 | 1.914766 | n1 | Inner circumferential region (diffraction structure) Middle circumferential region (diffraction structure) Outer circumferential region (sawtooth structure) |
| 2 | −1.58915 | WD |  | Aspheric surface |
| 3 | ∞ | DT | Disk | Planar surface |
| 4 | ∞ |  |  | Planar surface |
| Wavelength [μm] | 0.408 | 0.66 | 0.785 |  |
| Refractive Index (n1) | 1.52196 | 1.50413 | 1.50072 |  |
| Refractive Index (Disk) | 1.61642 | 1.57815 | 1.57203 |  |

TABLE 6

|  | Inner circumferential region | Middle circumferential region | Outer circumferential region |
| --- | --- | --- | --- |
|  | First surface | | |
| Region [mm] | 0 to 0.926 | 0.926 to 1.178 | 1.178 to 1.376 |
|  | Aspheric surface coefficient | | |
| R | 1.044929300 | 1.887470800 | 0.000000000 |
| k | −0.422804210 | −0.082125713 | 0.000000000 |
| A0 | 0.000000000 | 0.125089700 | 0.249754330 |
| A2 | 0.000000000 | 0.000000000 | 0.000000000 |
| A4 | −0.001761264 | −0.491336380 | 0.430972280 |
| A6 | 0.022244415 | 1.597216100 | −0.032996241 |
| A8 | −0.123237310 | −0.587224860 | −0.211117400 |
| A10 | 0.305313930 | −2.056690500 | 0.084856898 |
| A12 | −0.479248400 | 2.971698100 | 0.011826590 |
| A14 | 0.457804770 | −1.654225900 | 0.125430870 |
| A16 | −0.254629430 | 0.391937730 | −0.089697424 |
| A18 | 0.065244106 | −0.025451567 | −0.030141369 |
| A20 | 0.000000000 | 0.000000000 | 0.025977730 |
| A22 | 0.000000000 | 0.000000000 | 0.002902955 |
| A24 | 0.000000000 | 0.000000000 | −0.002597441 |
| A26 | 0.000000000 | 0.000000000 | 0.000000915 |
| A28 | 0.000000000 | 0.000000000 | 0.000000000 |
| A30 | 0.000000000 | 0.000000000 | 0.000000000 |
|  | Phase function | | |
| P2 | −116.47497 | 76.430933 | −143.61337 |
| P4 | 29.317694 | −287.15002 | 60.066907 |
| P6 | −39.984431 | 81.381766 | −67.430937 |
| P8 | 11.762346 | 0 | −15.072406 |
| P10 | 6.2657602 | 0 | 17.547412 |

TABLE 6-continued

|   | Inner circumferential region | Middle circumferential region | Outer circumferential region |
|---|---|---|---|
| | | Second surface | |
| Region [mm] | 0 to 0.398 | 0.398 to 0.663 | 0.663 to 1.05 |
| | | Aspheric surface coefficient | |
| R | −1.589150000 | −0.731206410 | −3.918884400 |
| k | −5.231186500 | −14.502139000 | 8.190179400 |
| A0 | 0.000000000 | 0.017962981 | −0.020566245 |
| A2 | 0.000000000 | 0.000000000 | 0.000000000 |
| A4 | 1.076481300 | 1.065217100 | 0.245773570 |
| A6 | −4.226767200 | −2.611154800 | −0.579860830 |
| A8 | 2.408400100 | 0.546892780 | 1.041783500 |
| A10 | 83.256008000 | −2.515100700 | −0.663155660 |
| A12 | −469.046270000 | 45.024238000 | −1.097120500 |
| A14 | 900.742510000 | −15.667000000 | 2.784684300 |
| A16 | 0.000000000 | −489.993190000 | −1.938362100 |
| A18 | 0.000000000 | 1212.744400000 | −0.479132390 |
| A20 | 0.000000000 | −885.837180000 | 1.178542000 |
| A22 | 0.000000000 | 0.000000000 | −0.343767220 |
| A24 | 0.000000000 | 0.000000000 | −0.046101690 |
| A26 | 0.000000000 | 0.000000000 | −0.023696905 |
| A28 | 0.000000000 | 0.000000000 | 0.027949089 |
| A30 | 0.000000000 | 0.000000000 | −0.003622827 |

As shown in FIG. 13, in the inner circumferential region of example 3, one annular zone cycle is formed by nine levels of steps which are continuously formed. In each annular zone, steps are defined as the first step, the second step, the third step, . . . , the ninth step, in order from the optical axis side to the outer side.

In FIG. 13, ten steps are present in one cycle, and a step corresponding to the tenth step is a step that gives the same phase difference as the first step. In the case where this diffraction structure is formed in the inner circumferential region, the step corresponding to the tenth step coincides with the first step of the adjacent diffraction shape, so that the tenth step and the first step cannot be distinguished from each other in the whole region. Therefore, this diffraction shape can be regarded as a nine-level step-like diffraction shape.

In other words, one cycle of this first diffraction structure corresponds to a range from a middle portion to the next middle portion of diffraction shapes whose one cycle is formed by a nine-level step-like shape that monotonously decreases.

The depth of each step forming one cycle of the step-like diffraction structure is designed so as to give a phase difference corresponding to about 1.11 wavelengths for light with a design wavelength for BD, and the depth between the fifth step and the sixth step is designed so as to give a phase difference corresponding to about 8.88 wavelengths in the opposite direction.

In the middle circumferential region of example 3, one annular zone cycle is formed by four levels of continuous steps. In each annular zone, steps are defined as the first step, the second step, the third step, and the fourth step, in order from the optical axis side to the outer side. The height of each step forming one cycle of the step-like diffraction structure is designed so as to give a phase difference corresponding to about 1.25 wavelengths for light with a design wavelength for BD, and the height between the second step and the third step is designed so as to give a phase difference corresponding to about 3.75 wavelengths in the opposite direction.

In the present example, the number of steps included between top portions of the first diffraction structure is nine, and the number of steps included between the optical axis and a top portion of the first diffraction structure, that is closest to the optical axis, is five.

A phase difference with reference to the phase at the aspheric surface in the inner circumferential region given by a step in the inner circumferential region, that is closest to the middle circumferential region, is about 0 wavelength for BD light, and about 0 wavelength for DVD light. In addition, a phase difference with reference to the phase at the aspheric surface in the middle circumferential region given by a step in the middle circumferential region, that is closest to the inner circumferential region, is about 1.875 wavelength for BD light, and about −1.125 wavelength for DVD light. The height of the step in the inner circumferential region that is closest to the middle circumferential region, from the aspheric surface in the inner circumferential region in the optical axis direction, is about 0 μm. The height of the step in the middle circumferential region that is closest to the inner circumferential region, from the aspheric surface in the middle circumferential region in the optical axis direction, is about 1.80 μm. An inclination angle made by the step in the inner circumferential region that is closest to the middle circumferential region, with respect to a plane perpendicular to the optical axis, is about 47.7 degree. An inclination angle made by the step in the middle circumferential region that is closest to the inner circumferential region, with respect to a plane perpendicular to the optical axis, is about 47.6 degree.

By such a configuration, for each of BD light and DVD light, the phases substantially align with each other at the connection portion C between the inner circumferential region and the middle circumferential region.

By thus designing, an optical element having compatibility among three wavelengths for BD, DVD, and CD and having an excellent light converging performance, can be realized.

The objective lens and the optical head apparatus including the same according to the present disclosure are effective for performing at least one of storage, reproduction, and deletion of information on an optical disc compliant with a plurality of standards using lights with different wavelengths.

As presented above, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An optical element having at least one surface divided into a plurality of regions, the optical element comprising:
   a first region including an optical axis and configured to converge light with a wavelength λ1 onto a storage surface of a first optical disc and converge light with a wavelength λ2 onto a storage surface of a second optical disc; and a second region formed around the outer circumference of the first region and configured to converge light with the wavelength λ1 onto the storage surface of the first optical disc and converge light with the wavelength λ2 onto the storage surface of the second optical disc, wherein the first region has a first diffraction structure cyclically formed on an aspheric surface and having a step-like cross section, the second region has a second diffraction structure cyclically formed on an aspheric surface and having a step-like cross section, and in the first region, the number of steps included between top portions of the first diffraction structure is different from the number of steps included between the optical axis and a top portion that is closest to the optical axis in the first diffraction structure.

2. An optical element having at least one surface divided into a plurality of regions, the optical element comprising:

a first region including an optical axis and configured to converge light with a wavelength λ1 onto a storage surface of a first optical disc and converge light with a wavelength λ2 onto a storage surface of a second optical disc; and a second region formed around the outer circumference of the first region and configured to converge light with the wavelength λ1 onto the storage surface of the first optical disc and converge light with the wavelength λ2 onto the storage surface of the second optical disc, wherein the first region has a first diffraction structure cyclically formed on a first aspheric surface and having a step-like cross section, and the second region has a second diffraction structure cyclically formed on a second aspheric surface and having a step-like cross section, and the optical element satisfying the following conditions:

$$-0.25 < (\Phi 11 + \Phi 12) - N1 < 0.25 \quad (1)$$

$$-0.25 < (\Phi 21 + \Phi 22) - N2 < 0.25 \quad (2)$$

where, $\Phi 11$ is a phase difference with reference to a phase at the first aspheric surface, $\Phi 11$ being given by a step in the first region, that is closest to the second region, for light with the wavelength λ1 to be converged onto the first optical disc, $\Phi 12$ is a phase difference with reference to a phase at the second aspheric surface, $\Phi 12$ being given by a step in the second region, that is closest to the first region, for light with the wavelength λ1 to be converged onto the first optical disc, $\Phi 21$ is a phase difference with reference to the phase at the first aspheric surface, $\Phi 21$ being given by the step in the first region, that is closest to the second region, for light with the wavelength λ2 to be converged onto the second optical disc, $\Phi 22$ is a phase difference with reference to the phase at the second aspheric surface, $\Phi 22$ being given by the step in the second region, that is closest to the first region, for light with the wavelength λ2 to be converged onto the second optical disc, N1 is an integer obtained by rounding the first decimal place of a numerical value given by $\Phi 11 + \Phi 12$, and N2 is an integer obtained by rounding the first decimal place of a numerical value given by $\Phi 21 + \Phi 22$.

3. The optical element according to claim 2, the optical element being an objective lens and satisfying the following conditions:

$$\Phi 11 = d1 \times \cos\{s1/(0.2 \times f + 1.1)\} \times (n1-1)/\lambda 1 \quad (3)$$

$$\Phi 12 = d2 \times \cos\{s2/(0.2 \times f + 1.1)\} \times (n1-1)/\lambda 1 \quad (4)$$

$$\Phi 21 = d1 \times \cos\{s1/(0.2 \times f + 1.1)\}(n2-1)/\lambda 2 \quad (5)$$

$$\Phi 22 = d2 \cos\{s2/(0.2 \times f + 1:1)\} \times (n2-1)/\lambda 2 \quad (6)$$

where, d1 is the height of the step in the first region, that is closest to the second region, from the first aspheric surface in the optical axis direction, d2 is the height of the step in the second region, that is closest to the first region, from the second aspheric surface in the optical axis direction, s1 is an inclination angle [deg] made by the outermost step in the first region with respect to a plane perpendicular to the optical axis, s2 is an inclination angle [deg] made by the innermost step in the second region with respect to the plane perpendicular to the optical axis, f is a focal length [mm] of the objective lens, n1 is a refractive index of the optical element for the wavelength and n2 is a refractive index of the optical element for the wavelength λ2.

4. The optical element according to claim 1, wherein the diffraction structure in the first region is a step-like diffraction structure having five to nine steps per one cycle.

5. The optical element according to claim 1, wherein the diffraction structure in the second region is a step-like diffraction structure having three to eight steps per one cycle, and the number of steps in one cycle of the diffraction structure in the second region is less than the number of steps in one cycle of the diffraction structure in the first region.

6. The optical element according to claim 1, wherein the wavelength λ1 is 350 to 450 nm, and the wavelength λ2 is 600 to 800 nm.

7. An optical head apparatus comprising the optical element according to claim 1.

8. The optical element according to claim 2, wherein the diffraction structure in the first region is a step-like diffraction structure having five to nine steps per one cycle.

9. The optical element according to claim 2, wherein the diffraction structure in the second region is a step-like diffraction structure having three to eight steps per one cycle, and the number of steps in one cycle of the diffraction structure in the second region is less than the number of steps in one cycle of the diffraction structure in the first region.

10. The optical element according to claim 2, wherein the wavelength λ1 is 350 to 450 nm, and the wavelength λ2 is 600 to 800 nm.

11. An optical head apparatus comprising the optical element according to claim 2.

* * * * *